US012785809B2

(12) United States Patent
Jiang et al.

(10) Patent No.: US 12,785,809 B2
(45) Date of Patent: Nov. 3, 2026

(54) ECONOMY CONFIGURATION METHOD AND APPARATUS FOR PASSIVE OPTICAL NETWORK, AND STORAGE MEDIUM

(71) Applicant: ZTE Corporation, Shenzhen (CN)

(72) Inventors: Yi Jiang, Shenzhen (CN); Bo Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 204 days.

(21) Appl. No.: 18/725,388

(22) PCT Filed: Feb. 14, 2022

(86) PCT No.: PCT/CN2022/076231
§ 371 (c)(1),
(2) Date: Jun. 28, 2024

(87) PCT Pub. No.: WO2023/123620
PCT Pub. Date: Jul. 6, 2023

(65) Prior Publication Data

US 2025/0184003 A1 Jun. 5, 2025

(30) Foreign Application Priority Data

Dec. 30, 2021 (CN) ........................ 202111663278.3

(51) Int. Cl.
*H04B 10/27* (2013.01)

(52) U.S. Cl.
CPC .................................. *H04B 10/27* (2013.01)

(58) Field of Classification Search
CPC ............... H01F 17/06; H01F 2038/006; H01F 2038/305; H04B 10/27; H04B 10/272;
(Continued)

(56) References Cited

U.S. PATENT DOCUMENTS 8,903,251 B2 * 12/2014 Cheng .................. H04B 10/272 398/58
2012/0008937 A1 * 1/2012 Cheng .................. H04B 10/272 398/1
(Continued)

FOREIGN PATENT DOCUMENTS

CN 101873518 A * 10/2010
CN 103391486 A * 11/2013
(Continued)

OTHER PUBLICATIONS

G.989.3A3 40-Gigabit passive optical networks (NG-PON2) (Year: 2021).*
(Continued)

*Primary Examiner* — David C Payne
*Assistant Examiner* — Mohammed Abdelraheem
(74) *Attorney, Agent, or Firm* — CANTOR COLBURN LLP

(57) ABSTRACT

Embodiments of the present disclosure provide an economy configuration method and apparatus for a passive optical network, and a storage medium. The economy configuration method includes: sending, by an Optical Line Terminal (OLT), an economy control message or message group to an Optical Network Unit (ONU), wherein the economy control message or message group comprises a first operating parameter and a second operating parameter of a Channel Pair (CP) between the OLT and the ONU; and configuring, by the OLT, the OLT according to the first operating parameter or the second operating parameter.

20 Claims, 9 Drawing Sheets

(58) Field of Classification Search
CPC .... H04B 10/806; H04J 14/0282; H04L 12/12; H04Q 11/00; H04Q 11/0067; H04Q 2011/0064; H04Q 2011/0086; H04Q 2213/1301; H04Q 2011/0079; H04Q 2011/0088
See application file for complete search history.

(56) References Cited

U.S. PATENT DOCUMENTS

| | | | | |
|---|---|---|---|---|
| 2012/0089371 | A1 | 4/2012 | Yamaguchi et al. | |
| 2015/0222440 | A1* | 8/2015 | Khotimsky | H04B 10/27 398/58 |
| 2016/0099792 | A1* | 4/2016 | Gao | H04J 14/0246 398/68 |

FOREIGN PATENT DOCUMENTS

| | | | | | |
|---|---|---|---|---|---|
| CN | 105592373 | A | * | 5/2016 | H04Q 11/0005 |
| EP | 2552084 | A1 | * | 1/2013 | H04B 10/272 |
| EP | 2566112 | A1 | * | 3/2013 | H04J 14/0247 |
| EP | 3939205 | B1 | * | 1/2025 | H04B 10/40 |
| WO | WO-2013014483 | A1 | * | 1/2013 | H04J 3/16 |
| WO | WO-2020181549 | A1 | * | 9/2020 | H04B 10/80 |

OTHER PUBLICATIONS

European Search Report for corresponding application EP22912927; Report dated Mar. 31, 2025.

Peter: "G.989.3A3 Draft Amendment 3; TDxxx/WP1". International Telecommunication Union, vol. 2/15, Oct. 18, 2019, pp. 1-274, XP044275774.

International Search Report PCT/CN2022/076231 filed Feb. 14, 2022; Mail date May 10, 2022.

Indian Office Action for corresponding application 202417051633 dated Jun. 30, 2026.

* cited by examiner

ECONOMY CONFIGURATION METHOD AND APPARATUS FOR PASSIVE OPTICAL NETWORK, AND STORAGE MEDIUM

CROSS REFERENCE

This application is a National Stage Filing of the PCT International Application No. PCT/CN2022/076231 filed on Feb. 14, 2022, which claims priority to Chinese Application No. 202111663278.3 filed on Dec. 30, 2021 with the China National Intellectual Property Adminstration, the entirety of which is herein incorporated by reference.

TECHNICAL FIELD

Embodiments of the present disclosure relate to the field of communications, and in particular, to an economy configuration method and apparatus for a Passive Optical Network (PON), and a storage medium.

BACKGROUND

With the development and maturation of optical communication technologies, more and more wired access networks adopt the Passive Optical Network (PON) technology. For example, the combination of the Wavelength Division Multiplexing (WDM) technology and the PON technology forms the WDM-PON technology, which has the characteristics of significantly increasing the transmission bandwidth of access networks, supporting Optical Network Unit (ONU) devices of different rates, etc., without the need of additional fiber optic lines for PON systems. Therefore, the WDM-PON technology has attracted attention and research in scenarios such as higher rate PON systems and multi-service access. However, as user demands for bandwidth and types of services continue to increase, the access devices in the PON systems become more complex, the number of access devices increases, and the total transmit power of Optical Line Terminals (OLT) and Optical Network Units (ONU) also increases, leading to a rapid increase in power consumption of the entire access system. Therefore, how to achieve flexible adjustment of an operating status in a passive optical network to effectively optimize power consumption has become a key concern for operators and device manufacturers.

SUMMARY

The embodiments of the present disclosure provide an economy configuration method and apparatus for a passive optical network, and a storage medium, which may at least solve the problem in the related art concerning how to achieve flexible adjustment of an operating status in a passive optical network.

According to some embodiments of the present disclosure, provided is an economy configuration method for a passive optical network, including: sending, by an Optical Line Terminal (OLT), an economy control message or message group to an Optical Network Unit (ONU), wherein the economy control message or message group includes a first operating parameter and a second operating parameter of a Channel Pair (CP) between the OLT and the ONU; and configuring, by the OLT, the OLT according to the first operating parameter or the second operating parameter.

According to some embodiments of the present disclosure, provided is an economy configuration method for a passive optical network, including: receiving, by an Optical Network Unit (ONU), an economy control message or message group sent by an Optical Line Terminal (OLT), wherein the economy control message or message group includes a first operating parameter and a second operating parameter of a Channel Pair (CP) between the OLT and the ONU; and configuring, by the ONU, the ONU according to the first operating parameter or the second operating parameter.

According to some embodiments of the present disclosure, provided is an economy configuration apparatus for a passive optical network, wherein the economy configuration apparatus is provided on an Optical Line Terminal (OLT). The economy configuration apparatus includes: a first sending module, adapted to send an economy control message or message group to an Optical Network Unit (ONU), wherein the economy control message or message group includes a first operating parameter and a second operating parameter of a Channel Pair (CP) between the OLT and the ONU; and a first configuration module, adapted to configure the OLT according to the first operating parameter or the second operating parameter.

According to some embodiments of the present disclosure, provided is an economy configuration apparatus for a passive optical network, wherein the economy configuration apparatus is provided on an Optical Network Unit (ONU). The economy configuration apparatus includes: a first receiving module, adapted to receive an economy control message or message group sent by an Optical Line Terminal (OLT), wherein the economy control message or message group includes a first operating parameter and a second operating parameter of a Channel Pair (CP) between the OLT and the ONU; and a second configuration module, adapted to configure the ONU according to the first operating parameter or the second operating parameter.

According to some embodiments of the present disclosure, a computer-readable storage medium is provided. The computer-readable storage medium stores a computer program, wherein the computer program, when being executed by a processor, causes the processor to implement operations of any one of the method embodiments.

According to some embodiments of the present disclosure, provided is an electronic device, including a memory and a processor, wherein the memory stores a computer program, and the processor is adapted to run the computer program so as to execute the operations in any one of the method embodiments.

By means of the solution in the embodiments of the present disclosure, an OLT sends an economy control message or message group to an ONU, and the economy control message or message group carries a first operating parameter and a second operating parameter of a CP between the OLT and the ONU, so that both the ONU and the OLT may configure a CP-related operating parameter on the ONU and the OLT according to the first operating parameter or the second operating parameter. Therefore, the problem concerning how to achieve flexible adjustment of an operating status in a passive optical network is solved, flexible configuration and adjustment of operating parameters in the passive optical network are realized, and the complexity of power savings and optimization of the passive optical network is reduced.

DETAILED DESCRIPTION

Figure 1:
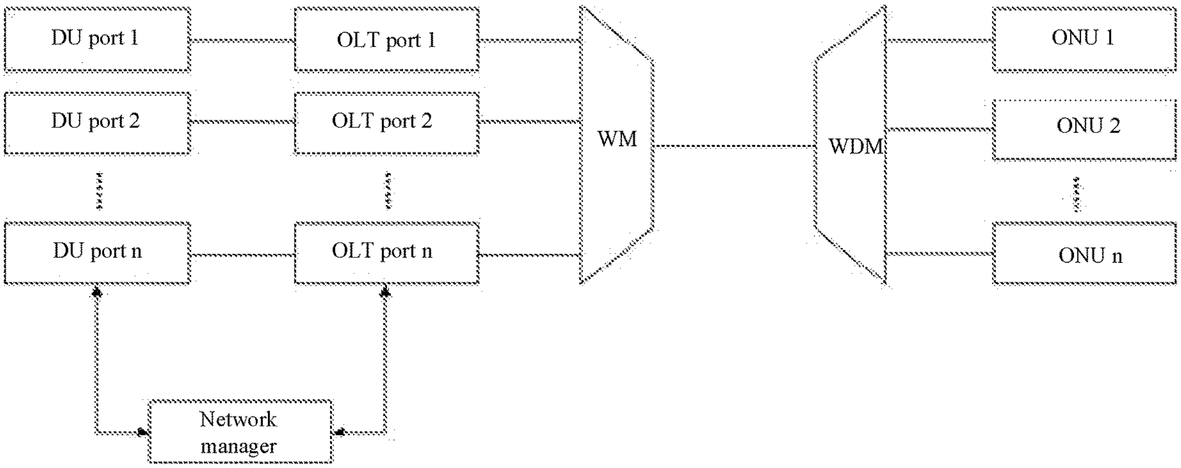
FIG. 1 is a block diagram of a WDM-PON power saving system in which an economy configuration method for a passive optical network is applied according to some embodiments of the present disclosure.

Power saving technologies for PON systems (e.g., WDM-PON systems) may be approached from the following aspects.

(1) A first method for power savings includes the following operations: detecting the total service load of the PON system, migrating ONUs from a low-load OLT port to one or more high-load OLT ports without reducing the quality of the service, and setting the low-load OLT port, from which the ONUs are migrated, to a sleep mode to achieve power savings. This method requires periodic detection of OLT loads and continuous manipulation of sleeping (closing) or restarting (opening) of OLT ports. In complex situations where user demands are constantly changing, it is difficult to guarantee power savings, and the implementation complexity is also high. Additionally, this method requires ONUs to re-register during the power saving process before they can work normally, interrupting the ongoing transmissions, making it unsuitable for access systems that require continuous service or low latency.

(2) A second method for power savings includes the following operations: detecting the occupancy rate of active wavelengths at the OLT in a Time Wavelength Division Multiplexing (TWDM)-PON system, closing wavelength channels with low occupancy rates, and tuning the corresponding ONUs to other wavelengths for data transmission to achieve power savings. This method requires periodic detection of OLT loads as well as the number of upstream data units of the ONUs, and continuous closing or opening of wavelength channels. In complex situations where user demands are constantly changing, it is difficult to guarantee power savings, and the implementation complexity is also high. Additionally, this method requires ONUs to re-register during the power saving process before they can work normally, interrupting the ongoing transmissions, making it unsuitable for access systems that require continuous service or low latency.

(3) A third method for power savings includes the following operations: adjusting a high-speed line rate to a low-speed line rate during idle periods to reduce the power consumption of the electric-layer chips and achieve power savings. This method adjusts the line rate by detecting the idle and busy periods of the line, thereby adjusting the power consumption of the OLT and ONUs, reducing complexity. However, although this method can achieve power savings by adjusting the rate, it does not fully consider the wavelength reusability of WDM-PON, so the power saving effect still needs to be further improved.

In summary, regardless of the economy (i.e., power saving) adjustment mechanism adopted, the following problems may be encountered, for example, high complexity, ONU re-registration during the power saving process, unsuitability for low-latency systems, and low efficiency. The embodiments of the present disclosure provide an economy configuration scheme for a passive optical network, which enables flexible configuration and adjustment of operating parameters in the passive optical network, and reduces the complexity of power optimization in the passive optical network. By adopting the scheme, after making economy adjustment decisions, determining to maintain the previous economy status, or determining to deactivate the economy mode, the desired operating parameters can be easily configured to achieve efficient, simple, and fast economy control.

The embodiments of the present disclosure will be described below in detail with reference to the accompanying drawings and in conjunction with embodiments.

It should be noted that, terms such as "first" and "second" in the specification, claims, and accompanying drawings of the present disclosure are used to distinguish similar objects, but are not necessarily used to describe a specific sequence or order.

The economy configuration method embodiments provided in the embodiments of the present disclosure may be executed in an OLT or an ONU or a passive optical network system (for example, a WDM-PON power saving system, which is also applicable to other types of PON systems) composed of the OLT and the ONU. Taking the operation on a WDM-PON power saving system as an example, FIG. 1 is a block diagram of a WDM-PON power saving system in which an economy configuration method for a passive optical network is applied according to some embodiments of the present disclosure. As shown in FIG. 1, the WDM-PON power saving system includes a network manager, an OLT, an ONU and an optical wavelength multiplexing network. A person having ordinary skill in the art may understand that the block diagram of the system shown in FIG. 1 is merely exemplary, and does not limit the composition structure of the foregoing WDM-PON power saving system. It should be noted that, in the embodiments of the present disclosure, the network manager here is a concept of a logical network element, and in actual implementation, a network management system or a network management platform formed by one network management device or a group of network management devices may be set in a system to implement a network management function, or the network management function may be arranged on another network element (for example, an OLT), and in this case, the OLT actually implements the network management function at the same time. Therefore, in the embodiments of the present disclosure, the network manager may include at least one of: a network management device in a passive optical network system, a network management system in a passive optical network system, a network management platform in a passive optical network system, and a network element (e.g., an OLT) arranged with a network management function in a passive optical network system.

Figure 2:
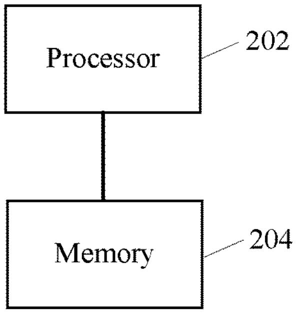
FIG. 2 is a basic structural block diagram of a network element in a passive optical network system according to some embodiments of the present disclosure.

FIG. 2 is a basic structural block diagram of a network element in a passive optical network system according to some embodiments of the present disclosure. As shown in FIG. 2, in the passive optical network system, each network element, such as an OLT or an ONU, may include one or more processors 202 (the one or more processors 202 may include but are not limited to processing apparatuses such as a Micro controller unit (MCU) or a Field Programmable Gate Array (FPGA)) and a memory 204 for storing data. The OLT and the ONU may further include ports for connecting other network elements. For example, the OLT may include a plurality of ports for connecting a plurality of ONUs, a network management system, a Distribute Unit (DU), and the like.

The memory 204 may be adapted to store a computer program, for example, a software program and a module of application software, such as a computer program corresponding to the economy configuration method for a passive optical network in the embodiments of the present disclosure. The one or more processors 202 may execute various function applications and data processing by running the computer program stored in the memory 204, thereby implementing the foregoing method. The memory 204 may include high-speed random access memory, and may also include non-volatile memory, such as one or more magnetic storage devices, flash memory, or other non-volatile solid-status memory.

Figure 3:
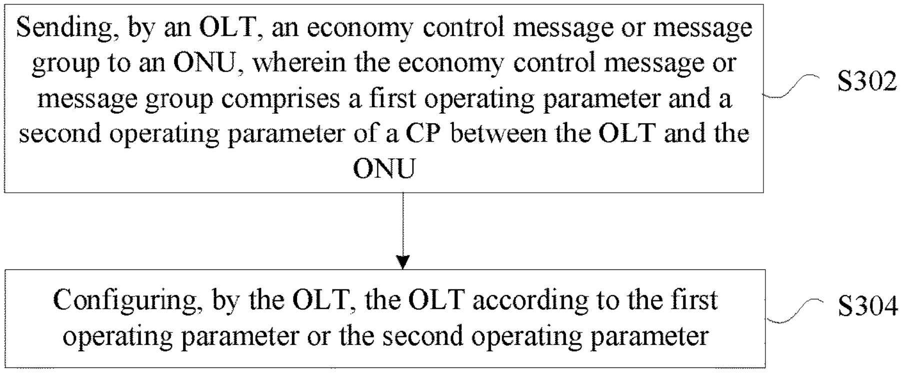
FIG. 3 is a flowchart of an economy configuration method for a passive optical network that operates on an OLT according to some embodiments of the present disclosure.

The embodiments of the present disclosure provide an economy configuration method for a passive optical network which operates on an OLT. FIG. 3 is a flowchart of an economy configuration method for a passive optical network that operates on an OLT according to some embodiments of the present disclosure. As shown in FIG. 3, the flow includes the following operations S302 and S304.

In operation S302, an OLT sends an economy control message or message group to an ONU, wherein the economy control message or message group includes a first operating parameter and a second operating parameter of a Channel Pair (CP) between the OLT and the ONU. In this operation, the first operating parameter and the second operating parameter need to be carried in the economy control message or message group. When the first operating parameter and the second operating parameter are carried in the economy control message group, a part of messages in the economy control message group may carry the first operating parameter, and the other part of messages in the economy control message group may carry the second operating parameter, as long as the economy control message group collectively carry the first operating parameter and the second operating parameter.

The first operating parameter and the second operating parameter are operating parameters of the CP. By carrying the first operating parameter and the second operating parameter in the economy control message or message group, the operating parameters can be notified to the ONU, so that the ONU configures the corresponding operating parameters of the CP according to the operating parameters in the economy control message or message group.

The economy adjustment process is substantively configuration of operating parameters, and this configuration may be a one-time configuration or a repeated multi-time configuration. By carrying the first operating parameter and the second operating parameter in the economy control message or message group and sending the economy control message or message group to the ONU, economy adjustment can be realized, or a previous economy status can be maintained, or the economy mode can be deactivated, because these processes are all actually realized by configuring operating parameters. For example, the economy adjustment process is to adjust an operating parameter of the CP from one operating parameter or a group of operating parameters to another operating parameter or another group of operating parameters with a stronger power saving effect. For another example, the previous economy status maintenance process is an inverse process, wherein the previous economy status maintenance process may also be referred to as an economy rollback process, in such as case, a new economy operating parameter may not be successfully configured and a configuration failure occurs in the configuration process; therefore, at this time, the new economy operating parameter needs to be abandoned, and the previous economy operating parameter continues to be used. For still another example, the economy deactivation process is to adjust an operating parameter of the CP from one operating parameter or a group of operating parameters with an economy effect to an original operating parameter or a group of original operating parameters in a non-economy status. Which economy related process is specifically implemented depends on the specific operating parameter(s) configured.

The economy control message or message group includes a first operating parameter and a second operating parameter of the CP, and specific values of the two operating parameters or the two groups of operating parameters may be selected according to an economy policy. The first operating parameter may be an operating parameter of the CP in a target economy status; the second operating parameter may be an operating parameter of the CP in an original status (namely, the original non-economy status) or a previous economy status. For example, a feasible implementation is that the first operating parameter and the second operating parameter are both operating parameters in an economy status, where the first operating parameter is an operating parameter in a target economy status, and the second operating parameter is an operating parameter in a previous economy status. In such a case, the economy control message or message group actually indicates a transition between two different economy statuses. Specifically, whether the adjustment is to be performed from the first operating parameter to the second operating parameter or from the second operating parameter to the first operating parameter may be indicated according to a corresponding economy mode status in the message or message group, and may alternatively be selected according to a transceiving condition of a message in the economy configuration process, which is described in detail in operation S304 below.

In at least one exemplary embodiment, each of the first operating parameter and the second operating parameter may include at least one of: a line rate and an operating wavelength. For example, both the first operating parameter and the second operating parameter may be the line rate, or both the first operating parameter and the second operating parameter may be the operating wavelength, or both the first operating parameter and the second operating parameter include both the line rate and the operating wavelength.

In operation S304, the OLT configures the OLT according to the first operating parameter or the second operating parameter.

It should be noted that the CP is a pair of upstream and downstream optical link channels used for connecting the OLT and the ONU, and which operating parameter(s) is to be applied for the CP needs to be configured at both ends of the OLT and the ONU. From the perspective of the OLT, the operating parameter of the CP needs to be configured at the OLT according to the first operating parameter or the second operating parameter. From the perspective of the ONU, the operating parameter of the CP needs to be configured at the ONU according to the first operating parameter or the second operating parameter.

In at least one exemplary embodiment, different configuration actions may be carried out in operation S304, depending on whether the current economy control message or message group is specifically used for economy adjustment, economy deactivation, or previous economy status maintenance. Some examples are provided as follows.

(1) In a case where the economy control message or message group is used for economy adjustment, the OLT configures the OLT according to the first operating parameter.

As described above, which operating parameter is to be adopted for the CP needs to be configured at both the OLT and the ONU, and whether the peer end receives the configuration instruction, whether the peer end agrees with the configuration, or whether the peer end is ready to start the configuration may be determined by a response message sent from the peer end. Therefore, in at least one exemplary embodiment, the operation that the OLT configures the OLT according to the first operating parameter includes: in a case where an economy adjustment response message returned by the ONU is received within a first preset duration after the economy control message or message group used for economy adjustment is sent, the OLT configures the OLT according to the first operating parameter.

In at least one exemplary embodiment, in a case where an economy adjustment response message returned by the ONU is not received within a first preset duration after the economy control message or message group used for economy adjustment is sent, the OLT sends the economy control message or message group used for economy deactivation or previous economy status maintenance to the ONU.

Here, it is required to compare the time elapsed after the economy control message or message group used for economy adjustment is sent with the first preset duration. There are various timing methods that may be adopted to acquire the elapsed time. For example, timing may be implemented by using a Super Count Frame (SFC) in a standard, timing may alternatively be implemented by using a local clock and a counter, and timing may alternatively be implemented based on a time stamp in a data packet, which is not limited in the embodiments of the present disclosure.

After sending the economy control message or message group, both the OLT and the ONU perform configuration adjustment, but the configuration at the OLT and the configuration at the ONU are mutually independent processes, and whether the configuration is successful can be checked through a synchronization process. The synchronization process may be initiated by the OLT, and in at least one exemplary embodiment, after the OLT configures the OLT according to the first operating parameter, the OLT sends a clock synchronization message to the ONU, and receives a synchronization response message returned by the ONU; in a case where the synchronization response message indicates synchronization success, the OLT performs data transmission with the ONU through the CP according to the first operating parameter; and in a case where the synchronization response message indicates synchronization failure, the OLT sends the economy control message or message group used for economy deactivation or previous economy status maintenance to the ONU.

(2) In a case where the economy control message or message group is used for economy deactivation or previous economy status maintenance, the OLT configures the OLT according to the second operating parameter.

As described above, which operating parameter is to be adopted for the CP needs to be configured at both the OLT and the ONU, and whether the peer end receives the configuration instruction, whether the peer end agrees with the configuration, or whether the peer end is ready to start the configuration may be determined by a response message sent from the peer end. Therefore, in at least one exemplary embodiment, the operation that the OLT configures the OLT according to the second operating parameter includes: in a case where an economy deactivation or previous economy status maintenance response message returned by the ONU is received within a second preset duration after the economy control message or message group used for economy deactivation or previous economy status maintenance is sent, the OLT configures the OLT according to the second operating parameter In at least one exemplary embodiment, in a case where an economy deactivation or previous economy status maintenance response message returned by the ONU is not received within a second preset duration after the economy control message or message group used for economy deactivation or previous economy status maintenance is sent, the OLT sends the economy control message or message group used for economy deactivation or previous economy status maintenance to the ONU again.

Here, it is required to compare the time elapsed after the economy control message or message group used for economy adjustment is sent with the second preset duration. There are various timing methods that may be adopted to acquire the elapsed time. For example, timing may be implemented by using a Super Count Frame (SFC) in a standard, timing may alternatively be implemented by using a local clock and a counter, and timing may alternatively be implemented based on a time stamp in a data packet, which is not limited in the embodiments of the present disclosure.

After sending the economy control message or message group, both the OLT and the ONU perform configuration adjustment, but the configuration at the OLT and the configuration at the ONU are mutually independent processes, and whether the configuration is successful can be checked through a synchronization process. The synchronization process may be initiated by the OLT, and in at least one exemplary embodiment, after the OLT configures the OLT according to the second operating parameter, the OLT sends a clock synchronization message to the ONU, and receives a synchronization response message returned by the ONU; in a case where the synchronization response message indicates synchronization success, the OLT performs data transmission with the ONU through the CP according to the second operating parameter; and in a case where the synchronization response message indicates synchronization failure, the OLT sends the economy control message or message group used for economy deactivation or previous economy status maintenance to the ONU.

It can be seen from the above explanation that no matter which economy configuration is to be applied, e.g., no matter whether it is economy adjustment, or economy deactivation, or previous economy status maintenance, message interaction between the OLT and the ONU is involved. In the entire economy configuration method for the passive optical network, from the perspective of the OLT, an involved message interaction process may include sending an economy control message or message group (which may be used for economy adjustment, and may alternatively be used for economy deactivation or previous economy status maintenance), receiving a response message (which may be an economy adjustment response, and may alternatively be an economy deactivation response or a previous economy status maintenance response), sending a clock synchronization message, and receiving a synchronization response message (which may indicate synchronization success, and may alternatively indicate synchronization failure). The OLT and the ONU can learn, based on these messages, a current configuration status of the peer end, and in combination with a configuration status at the local end, the OLT and the ONU can learn which operation should be subsequently performed and which message should be sent. Certainly, this purpose may also be achieved by carrying corresponding information in the message. For example, in at least one exemplary embodiment, the economy control message or message group may further include at least one of the following:

- an economy mode status, wherein the economy mode status is used for indicating whether the economy control message or message group is used for economy adjustment, or is used for economy deactivation or previous economy status maintenance; by means of the economy mode status, it can be learned whether the current economy control message or message group is used for economy adjustment, or is used for economy deactivation or previous economy status maintenance;
- a status flag, wherein the status flag is used for indicating a current phase to which the economy control message or message group belongs in an economy adjustment procedure or in an economy deactivation or previous economy status maintenance procedure.

It should be noted that the economy control message or message group may be one of the following messages: a Physical Layer Operations, Administration and Maintenance (PLOAM) message, an Operations, Administration and Maintenance (OAM) message, an Optical Network Terminal Management and Control Interface (OMCI) message, a Technical Report 069 (TR069) protocol message, a Network Configuration (NETCONF) management model message, a YANG management model message, and a Simple Network Management Protocol (SNMP) message. In addition to carrying the first operating parameter, the second operating parameter, the economy mode status, and the status flag by extension, other parts of the messages may adopt a message format in a standard. For example, the economy control message or message group may further include at least one of: an identifier of the ONU; a message sequence number; a message type identifier, wherein the message type identifier is used for indicating whether the economy control message or message group is an instruction (inquire) type message sent by the OLT or a response (response) type message returned by the ONU; and a message check bit.

It can be seen from the above description that, by means of the economy configuration method for the passive optical network, flexible configuration and adjustment of operating parameters in the passive optical network can be realized, thereby reducing the complexity of power saving optimization of the passive optical network, so that after a system makes economy adjustment decisions, determines to maintain the previous economy status, or determines to deactivate the economy mode, desired operating parameters can be conveniently configured, thereby realizing economy control in an efficient, simple and fast manner.

In view of the economy requirement in the passive optical network, this embodiment also describes how to perform economy adjustment (including economy activation and further adjustment), how to determine to restore (roll back) to a previous economy status or turn off (deactivate) the economy mode, and how to determine which economy policy is to be adopted. After determining, based on the solution, to activate and restore the previous economy status or to turn off (deactivate) the economy mode, and after determining an adopted operating parameter, the desired operating parameter can be configured by using the foregoing method, thereby realizing economy control in an efficient, simple, and fast manner.

I. Economy Adjustment (Including Economy Activation and Further Economy Adjustment)

The economy activation may be implemented in two modes: a manual activation mode and a system automatic activation mode, and similarly, the decision on economy may also be made manually or automatically by the system.

In at least one exemplary embodiment, the economy configuration method for the passive optical network may further include at least one of the following operations.

(1) The OLT receives an adjustment policy used for performing economy adjustment for the CP and designated in a manual manner, and generates, based on the adjustment policy, the economy control message or message group used for economy adjustment. In at least one exemplary embodiment, the adjustment policy includes one of: adjusting a line rate of the CP; adjusting the CP to enter a sleep mode (tuning the CP to a sleep dedicated operating wavelength, and adjusting the rate of the CP to a sleep dedicated line rate); or adjusting a line rate and an operating wavelength of the CP.

In at least one exemplary embodiment, before the adjustment policy used for performing economy adjustment for the CP is designated in the manual manner, the economy configuration method may further include:

- determining that a first condition is satisfied, wherein the first condition includes at least one of the following sub-conditions:
- a current time satisfies an economy time parameter configured by the network manager;

the OLT and/or the ONU are located in an area range defined by a device area parameter configured by a network device;

the OLT and/or the ONU belong to a type range defined by a device type parameter configured by the network device; and the OLT and/or the ONU support economy adjustment.

The first condition is mainly used to determine the current time, the area, the device type, and whether a support condition for economy satisfies a requirement for performing economy adjustment, for example, whether an activation time condition for economy is satisfied currently (whether belonging to a range of an economy time), and whether a device range (a device area and a device type) is satisfied. It should be understood that the first condition is not limited to the conditions listed above, and may be configured according to an actual condition and a requirement.

(2) The OLT determines, according to a load of the CP, to perform economy adjustment for the CP, selects an adjustment policy used for performing economy adjustment, and generates, based on the adjustment policy, the economy control message or message group used for economy adjustment. In at least one exemplary embodiment, the adjustment policy includes one of: adjusting a line rate of the CP; adjusting the CP to enter a sleep mode (tuning the CP to a sleep dedicated operating wavelength, and adjusting the rate of the CP to a sleep dedicated line rate); or adjusting a line rate and an operating wavelength of the CP.

In at least one exemplary embodiment, before it is determined, according to the load of the CP, to perform economy adjustment for the CP, the economy configuration method may further include:

determining that a first condition is satisfied, wherein the first condition includes at least one of the following sub-conditions:

a current time satisfies an economy time parameter configured by the network manager;

the OLT and/or the ONU are located in an area range defined by a device area parameter configured by a network device;

the OLT and/or the ONU belong to a type range defined by a device type parameter configured by the network device; and the OLT and/or the ONU support economy adjustment.

The first condition is mainly used to determine the current time, the area, the device type, and whether a support condition for economy satisfies a requirement for performing economy adjustment, for example, whether an activation time condition for economy is satisfied currently (whether belonging to a range of an economy time), and whether a device range (a device area and a device type) is satisfied. It should be understood that the first condition is not limited to the conditions listed above, and may be configured according to an actual condition and a requirement.

In at least one exemplary embodiment, the operation that the OLT determines, according to the load of the CP, to perform economy adjustment for the CP includes: in a case where it is determined that a second condition is satisfied according to the load of the CP, determining to perform economy adjustment for the CP, wherein the second condition includes that the load of the CP is lower than a load threshold. The second condition is mainly used for judging whether economy is required for the current load of the CP.

In at least one exemplary embodiment, the operation of selecting the adjustment policy for economy adjustment includes:

selecting, based on a third condition, the adjustment policy used for economy adjustment, wherein the third condition is mainly used for selecting which adjustment policy is specifically used to perform economy adjustment, and may include at least one of the following sub-conditions:

in a case where the load of the CP satisfies a CP sleep condition, selecting the adjustment policy of adjusting the CP to enter the sleep mode;

in a case where there are other wavelength channels having an optical link power level lower than a current optical link power level of the CP, selecting the adjustment policy of adjusting the operating wavelength of the CP, wherein after the operating wavelength of the CP is adjusted, the line rate of the CP is determined based on the other wavelength channels; in this case, the line rate is determined based on the other wavelength channels, the optical power level of which is lower than the current optical power level of the CP; and the value of the line rate may be the same as or may be different from the original line rate;

in a case where there are no other wavelength channels having an optical link power level lower than the current optical link power level of the CP, and there is another line rate that is lower than a current line rate and is able to fulfill transmission of the current load of the CP, selecting the adjustment policy of adjusting the line rate of the CP, wherein the line rate after the adjustment is said another line rate.

In summary, the third condition is used to determine in which way optimum power savings can be achieved for a channel for which an economy mode needs to be activated. In this case, available resources of the whole WDM-PON system may be analyzed, and it is determined in which manner the best power saving effect can be achieved.

(3) The OLT receives an adjustment policy used for economy adjustment for the CP and sent by a network manager after the network manager determines, according to a load of the CP, to perform economy adjustment for the CP and selects an adjustment policy used for performing economy adjustment, and generates, based on the adjustment policy, the economy control message or message group used for economy adjustment. In at least one exemplary embodiment, the adjustment policy includes one of: adjusting a line rate of the CP; adjusting the CP to enter a sleep mode (tuning the CP to a sleep dedicated operating wavelength, and adjusting the rate of the CP to a sleep dedicated line rate); or adjusting a line rate and an operating wavelength of the CP.

In at least one exemplary embodiment, before the network manager determines, according to the load of the CP, to perform economy adjustment for the CP, the economy configuration method may further include:

determining that a first condition is satisfied, wherein the first condition includes at least one of the following sub-conditions:

a current time satisfies an economy time parameter configured by the network manager;

the OLT and/or the ONU are located in an area range defined by a device area parameter configured by a network device;

the OLT and/or the ONU belong to a type range defined by a device type parameter configured by the network device; and the OLT and/or the ONU support economy adjustment.

The first condition is mainly used to determine the current time, the area, the device type, and whether a support condition for economy satisfies a requirement for performing economy adjustment, for example, whether an activation time condition for economy is satisfied currently (whether belonging to a range of an economy time), and whether a device range (a device area and a device type) is satisfied. It should be understood that the first condition is not limited to the conditions listed above, and may be configured according to an actual condition and a requirement.

In at least one exemplary embodiment, the operation that the network manager determines, according to the load of the CP, to perform economy adjustment for the CP includes: in a case where it is determined that a second condition is satisfied according to the load of the CP, determining to perform economy adjustment for the CP, wherein the second condition includes that the load of the CP is lower than a load threshold. The second condition is mainly used for judging whether economy is required for the current load of the CP.

In at least one exemplary embodiment, the operation of selecting the adjustment policy for economy adjustment includes:

selecting, based on a third condition, the adjustment policy used for economy adjustment, wherein the third condition is mainly used for selecting which adjustment policy is specifically used to perform economy adjustment, and may include at least one of the following sub-conditions:

in a case where the load of the CP satisfies a CP sleep condition, selecting the adjustment policy of adjusting the CP to enter the sleep mode;

in a case where there are other wavelength channels having an optical link power level lower than a current optical link power level of the CP, selecting the adjustment policy of adjusting the operating wavelength of the CP, wherein after the operating wavelength of the CP is adjusted, the line rate of the CP is determined based on the other wavelength channels; in this case, the line rate is determined based on the other wavelength channels, the optical power level of which is lower than the current optical power level of the CP; and the value of the line rate may be the same as or may be different from the original line rate;

in a case where there are no other wavelength channels having an optical link power level lower than the current optical link power level of the CP, and there is another line rate that is lower than a current line rate and is able to fulfill transmission of the current load of the CP, selecting the adjustment policy of adjusting the line rate of the CP, wherein the line rate after the adjustment is said another line rate.

In summary, the third condition is used to determine in which way optimum power savings can be achieved for a channel for which an economy mode needs to be activated. In this case, available resources of the whole WDM-PON system may be analyzed, and it is determined in which manner the best power saving effect can be achieved.

II. Restore (Roll Back) to Previous Economy Status or Deactivate Economy

In at least one exemplary embodiment, the power saving configuration method for the passive optical network may further include one of the following operations.

(1) The OLT receives an instruction used for performing economy deactivation or previous economy status maintenance for the CP and designated in a manual manner, and generates, based on the instruction, the economy control message or message group used for economy deactivation or previous economy status maintenance.

(2) The OLT determines that that an economy condition is not satisfied currently, and generates the economy control message or message group used for economy deactivation.

(3) The OLT receives an instruction used for performing economy deactivation for the CP and sent by a network manager after the network manager determines that an economy condition is not satisfied currently, and generates, based on the instruction, the economy control message or message group used for economy deactivation.

In at least one exemplary embodiment, the economy condition includes a first condition, a second condition and a third condition.

The first condition includes at least one of the following sub-conditions: a current time satisfies an economy time parameter configured by the network manager; the OLT and/or the ONU are located in an area range defined by a device area parameter configured by a network device; the OLT and/or the ONU belong to a type range defined by a device type parameter configured by the network device; and the OLT and/or the ONU support economy adjustment.

The second condition includes that a load of the CP is lower than a load threshold.

The third condition includes at least one of the following sub-conditions: in a case where the load of the CP satisfies a CP sleep condition, selecting an adjustment policy of adjusting the CP to enter a sleep mode; in a case where there are other wavelength channels having an optical link power level lower than a current optical link power level of the CP, selecting the adjustment policy of adjusting an operating wavelength of the CP, wherein after the operating wavelength of the CP is adjusted, a line rate of the CP is determined based on the other wavelength channels; in a case where there are no other wavelength channels having an optical link power level lower than the current optical link power level of the CP, and there is another line rate that is lower than a current line rate and is able to fulfill transmission of the current load of the CP, selecting the adjustment policy of adjusting the line rate of the CP, wherein the line rate after the adjustment is said another line rate.

Through the description of the foregoing embodiments, a person having ordinary skill in the art may clearly understand that the economy configuration method according to the foregoing embodiments may be implemented by software in addition to a necessary universal hardware platform, and definitely may also be implemented by hardware. However, in many cases, the former is a preferred implementation. Based on such understanding, the essence of the technical solutions of the present disclosure or the part contributing to the related art may be embodied in the form of a software product. The computer software product is stored in a storage medium (such as a Read-only Memory (ROM)/Random Access Memory (RAM), a magnetic disk, or an optical disk), and includes several instructions for instructing a terminal device (which may be a mobile phone, a computer, a server, or a network device) to execute the economy configuration method described in the embodiments of the present disclosure.

Figure 4:
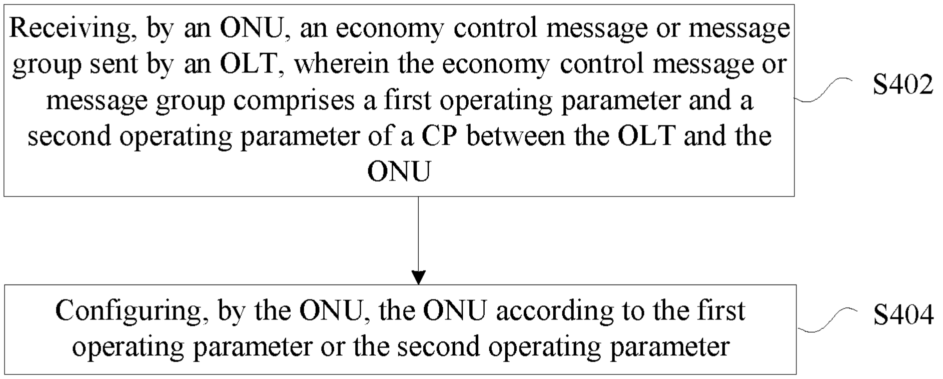
FIG. 4 is a flowchart of an economy configuration method for a passive optical network that operates on an ONU according to some embodiments of the present disclosure.

The embodiments of the present disclosure provide an economy configuration method for a passive optical network that operates on an ONU. FIG. 4 is a flowchart of an economy configuration method for a passive optical network that operates on an ONU according to some embodiments of the present disclosure. As shown in FIG. 4, the flow includes the following operations S402 and S404.

In operation S402, an ONU receives an economy control message or message group sent by an OLT, wherein the economy control message or message group includes a first operating parameter and a second operating parameter of a Channel Pair (CP) between the OLT and the ONU. In this operation, the first operating parameter and the second operating parameter need to be carried in the economy control message or message group. When the first operating parameter and the second operating parameter are carried in the economy control message group, a part of messages in the economy control message group may carry the first operating parameter, and the other part of messages in the economy control message group may carry the second operating parameter, as long as the economy control message group collectively carry the first operating parameter and the second operating parameter.

The first operating parameter and the second operating parameter are operating parameters of the CP. By carrying the first operating parameter and the second operating parameter in the economy control message or message group, the operating parameters can be notified to the ONU, so that the ONU configures the corresponding operating parameters of the CP according to the operating parameters in the economy control message or message group.

The economy adjustment process is substantively configuration of operating parameters, and this configuration may be a one-time configuration or a repeated multi-time configuration. By carrying the first operating parameter and the second operating parameter in the economy control message or message group and sending the economy control message or message group to the ONU, economy adjustment can be realized, or a previous economy status can be maintained, or the economy mode can be deactivated, because these processes are all actually realized by configuring operating parameters. For example, the economy adjustment process is to adjust an operating parameter of the CP from one operating parameter or a group of operating parameters to another operating parameter or another group of operating parameters with a stronger power saving effect. For another example, the previous economy status maintenance process is an inverse process, wherein the previous economy status maintenance process may also be referred to as an economy rollback process, in such as case, a new economy operating parameter may not be successfully configured and a configuration failure occurs in the configuration process; therefore, at this time, the new economy operating parameter needs to be abandoned, and the previous economy operating parameter continues to be used. For still another example, the economy deactivation process is to adjust an operating parameter of the CP from one operating parameter or a group of operating parameters with an economy effect to an original operating parameter or a group of original operating parameters in a non-economy status. Which economy related process is specifically implemented depends on the specific operating parameter(s) configured.

The economy control message or message group includes a first operating parameter and a second operating parameter of the CP, and specific values of the two operating parameters or the two groups of operating parameters may be selected according to an economy policy. The first operating parameter may be an operating parameter of the CP in a target economy status; the second operating parameter may be an operating parameter of the CP in an original status (namely, the original non-economy status) or a previous economy status. For example, a feasible implementation is that the first operating parameter and the second operating parameter are both operating parameters in an economy status, where the first operating parameter is an operating parameter in a target economy status, and the second operating parameter is an operating parameter in a previous economy status. In such a case, the economy control message or message group actually indicates a transition between two different economy statuses. Specifically, whether the adjustment is to be performed from the first operating parameter to the second operating parameter or from the second operating parameter to the first operating parameter may be indicated according to a corresponding economy mode status in the message or message group, and may alternatively be selected according to a transceiving condition of a message in the economy configuration process, which is described in detail in operation S404 below.

In at least one exemplary embodiment, each of the first operating parameter and the second operating parameter may include at least one of: a line rate and an operating wavelength. For example, both the first operating parameter and the second operating parameter may be the line rate, or both the first operating parameter and the second operating parameter may be the operating wavelength, or both the first operating parameter and the second operating parameter include both the line rate and the operating wavelength.

In operation S404, the ONU configures the ONU according to the first operating parameter or the second operating parameter.

It should be noted that the CP is a pair of upstream and downstream optical link channels used for connecting the OLT and the ONU, and which operating parameter(s) is to be applied for the CP needs to be configured at both ends of the OLT and the ONU. From the perspective of the ONU, the operating parameter of the CP needs to be configured at the ONU according to the first operating parameter or the second operating parameter. From the perspective of the OLT, the operating parameter of the CP needs to be configured at the OLT according to the first operating parameter or the second operating parameter.

In at least one exemplary embodiment, different configuration actions may be carried out in operation S404, depending on whether the current economy control message or message group is specifically used for economy adjustment, economy deactivation, or previous economy status maintenance. Some examples are provided as follows.

(1) In a case where the economy control message or message group is used for economy adjustment, the ONU configures the ONU according to the first operating parameter.

As described above, which operating parameter is to be adopted for the CP needs to be configured at both the OLT and the ONU, and whether the ONU receives the configuration instruction, whether the ONU agrees with the configuration, or whether the ONU is ready to start the configuration may be notified to the OLT by sending a response message to the OLT. Therefore, in at least one exemplary embodiment, the operation that the ONU configures the ONU according to the first operating parameter includes: the ONU parses the economy control message or message group used for economy adjustment, returns an economy adjustment response message to the OLT, and then configures the ONU according to the first operating parameter.

(2) In a case where the economy control message or message group is used for economy deactivation or previous economy status maintenance, the ONU configures the ONU according to the second operating parameter.

As described above, which operating parameter is to be adopted for the CP needs to be configured at both the OLT and the ONU, and whether the ONU receives the configuration instruction, whether the ONU agrees with the configuration, or whether the ONU is ready to start the configuration may be notified to the OLT by sending a response message to the OLT. Therefore, in at least one exemplary embodiment, the operation that the ONU configures the ONU according to the second operating parameter includes: the ONU parses the economy control message or message group used for economy deactivation or previous economy status maintenance, returns an economy deactivation or previous economy status maintenance response message to the OLT, and then configures the ONU according to the second operating parameter.

After sending the economy control message or message group, both the OLT and the ONU perform configuration adjustment, but the configuration at the OLT and the configuration at the ONU are mutually independent processes, and whether the configuration is successful can be checked through a synchronization process. The synchronization process may be initiated by the OLT, and in at least one exemplary embodiment, the economy configuration method may further include: the ONU receives a clock synchronization message sent by the OLT; the ONU performs clock synchronization based on the clock synchronization message, and returns a synchronization response message to the OLT, where the synchronization response message indicates synchronization success or synchronization failure.

It can be seen from the above explanation that no matter which economy configuration is to be applied, e.g., no matter whether it is economy adjustment, or economy deactivation, or previous economy status maintenance, message interaction between the OLT and the ONU is involved. In the entire economy configuration method for the passive optical network, from the perspective of the ONU, an involved message interaction process may include receiving an economy control message or message group (which may be used for economy adjustment, and may alternatively be used for economy deactivation or previous economy status maintenance), sending a response message (which may be an economy adjustment response, and may alternatively be an economy deactivation response or a previous economy status maintenance response), receiving a clock synchronization message, and sending a synchronization response message (which may indicate synchronization success, and may alternatively indicate synchronization failure). The OLT and the ONU can learn, based on these messages, a current configuration status of the peer end, and in combination with a configuration status at the local end, the OLT and the ONU can learn which operation should be subsequently performed and which message should be sent. Certainly, this purpose may also be achieved by carrying corresponding information in the message. For example, in at least one exemplary embodiment, the economy control message or message group may further include at least one of the following:

an economy mode status, wherein the economy mode status is used for indicating whether the economy control message or message group is used for economy adjustment, or is used for economy deactivation or previous economy status maintenance; by means of the economy mode status, it can be learned whether the current economy control message or message group is used for economy adjustment, or is used for economy deactivation or previous economy status maintenance;

a status flag, wherein the status flag is used for indicating a current phase to which the economy control message or message group belongs in an economy adjustment procedure or in an economy deactivation or previous economy status maintenance procedure.

It should be noted that the economy control message or message group may be one of the following messages: a Physical Layer Operations, Administration and Maintenance (PLOAM) message, an Operations, Administration and Maintenance (OAM) message, an Optical Network Terminal Management and Control Interface (OMCI) message, a Technical Report 069 (TR069) protocol message, a Network Configuration (NETCONF) management model message, a YANG management model message, and a Simple Network Management Protocol (SNMP) message. In addition to carrying the first operating parameter, the second operating parameter, the economy mode status, and the status flag by extension, other parts of the messages may adopt a message format in a standard. For example, the economy control message or message group may further include at least one of: an identifier of the ONU; a message sequence number; a message type identifier, wherein the message type identifier is used for indicating whether the economy control message or message group is an instruction (inquire) type message sent by the OLT or a response (response) type message returned by the ONU; and a message check bit.

It can be seen from the above description that, by means of the economy configuration method for the passive optical network, flexible configuration and adjustment of operating parameters in the passive optical network can be realized, thereby reducing the complexity of power saving optimization of the passive optical network, so that after a system makes economy adjustment decisions, determines to maintain the previous economy status, or determines to deactivate the economy mode, desired operating parameters can be conveniently configured, thereby realizing economy control in an efficient, simple and fast manner.

Through the description of the foregoing embodiments, a person having ordinary skill in the art may clearly understand that the economy configuration method according to the foregoing embodiments may be implemented by software in addition to a necessary universal hardware platform, and definitely may also be implemented by hardware. However, in many cases, the former is a preferred implementation. Based on such understanding, the essence of the technical solutions of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the economy configuration methods described in the embodiments of the present disclosure.

The embodiments of the present disclosure further provide an economy configuration apparatus for a passive optical network, which is provided on an OLT. The economy configuration apparatus is used for implementing the foregoing embodiments and exemplary implementations, and what has been described will not be elaborated. The term "module", as used hereinafter, is a combination of software and/or hardware capable of realizing a predetermined function. Although the economy configuration apparatus described in the following embodiment is preferably implemented by software, implementation of hardware or a combination of software and hardware is also possible and conceived.

Figure 5:
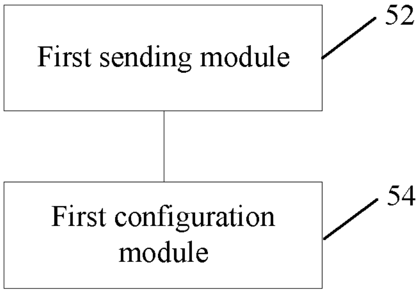
FIG. 5 is a structure block diagram of an economy configuration apparatus for a passive optical network provided on an OLT according to some embodiments of the present disclosure.

FIG. 5 is a structure block diagram of an economy configuration apparatus for a passive optical network provided on an OLT according to some embodiments of the present disclosure. As shown in FIG. 5, the economy configuration apparatus includes:

a first sending module 52, adapted to send an economy control message or message group to an Optical Network Unit (ONU), wherein the economy control message or message group includes a first operating parameter and a second operating parameter of a Channel Pair (CP) between the OLT and the ONU; and a first configuration module 54, adapted to configure the OLT according to the first operating parameter or the second operating parameter.

It should be noted that each module may be implemented by software or hardware. The latter may be implemented in the following manner, but is not limited thereto. All the modules are located in a same processor; alternatively, the modules are located in different processors in an arbitrary combination.

For specific examples in this embodiment, reference may be made to the examples described in the foregoing embodiments and exemplary embodiments, and details are not repeatedly described in this embodiment.

The embodiments of the present disclosure further provide an economy configuration apparatus for a passive optical network, which is provided on an ONU. The economy configuration apparatus is adapted to implement the foregoing embodiments and example implementations, and what has been described is not repeated herein. The term "module", as used hereinafter, is a combination of software and/or hardware capable of realizing a predetermined function. Although the economy configuration apparatus described in the following embodiment is preferably implemented by software, implementation of hardware or a combination of software and hardware is also possible and conceived.

Figure 6:
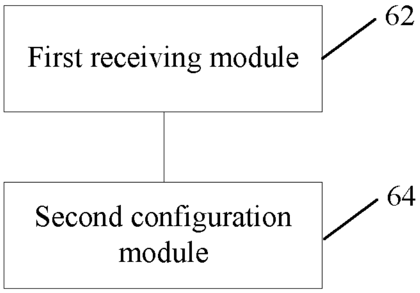
FIG. 6 is a structure block diagram of an economy configuration apparatus for a passive optical network provided on an ONU according to some embodiments of the present disclosure.

FIG. 6 is a structure block diagram of an economy configuration apparatus for a passive optical network provided on an ONU according to some embodiments of the present disclosure. As shown in FIG. 6, the economy configuration apparatus includes:

a first receiving module 62, adapted to receive an economy control message or message group sent by an Optical Line Terminal (OLT), wherein the economy control message or message group includes a first operating parameter and a second operating parameter of a Channel Pair (CP) between the OLT and the ONU; and a second configuration module 64, adapted to configure the ONU according to the first operating parameter or the second operating parameter.

It should be noted that each module may be implemented by software or hardware. The latter may be implemented in the following manner, but is not limited thereto. All the modules are located in a same processor; alternatively, the modules are located in different processors in an arbitrary combination.

For specific examples in this embodiment, reference may be made to the examples described in the foregoing embodiments and exemplary embodiments, and details are not repeatedly described in this embodiment.

The embodiments of the present disclosure also provide a computer-readable storage medium. The computer-readable storage medium stores a computer program, wherein the computer program, when being executed by a processor, causes the processor to execute the operations in any one of the described method embodiments.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

For specific examples in this embodiment, reference may be made to the examples described in the foregoing embodiments and exemplary embodiments, and details are not repeatedly described in this embodiment.

The embodiments of the present disclosure further provide an electronic device, including a memory and a processor. The memory stores a computer program. The processor is adapted to execute the computer program to implement operations in any one of the economy configuration method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

This scheme can overcome the problems of high complexity of power saving technology in the passive optical network, the need to re-register ONU during power saving process, as well as the inability to be applied to low-latency systems and low efficiency. The economy configuration scheme for the passive optical network may be applied to the system shown in FIG. 1. The transmission data flow is monitored or predicted by the network management platform, and the line rate or operating wavelength is adjusted according to the combined set of economy judgment conditions. The adjustment process will use the management control channel between the OLT and the ONU, and the ONU will not be re-registered during the entire adjustment process. The economy configuration technology for the WDM-PON system may be achieved in two modes, which are respectively manual activation and system automatic activation. Regardless of the activation method, the OLT and the upstream equipment monitor or predict service traffic through a unified network management platform.

Figure 7:
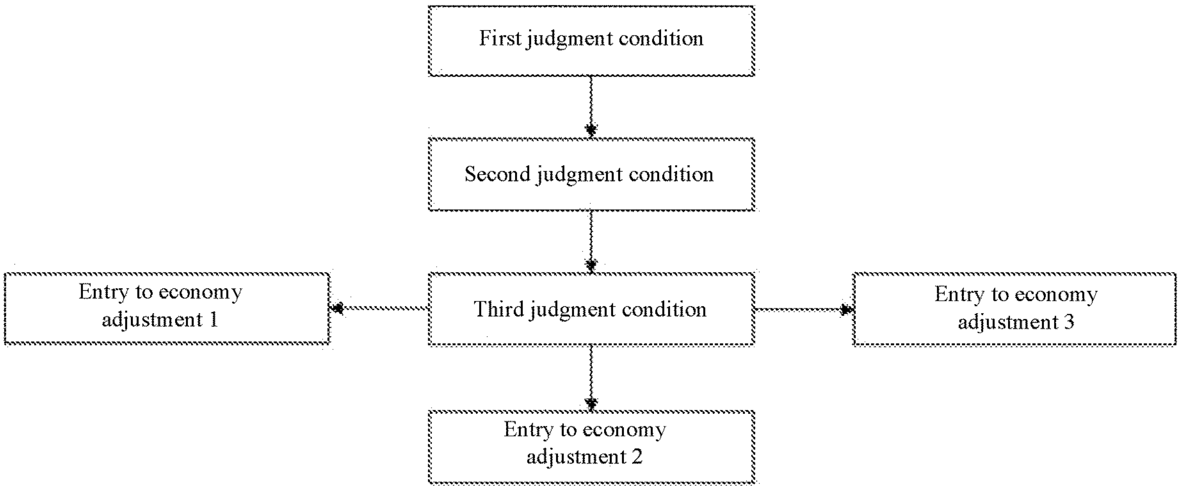
FIG. 7 is a schematic diagram of a relation of triple judgment conditions for economy adjustment according to some embodiments of the present disclosure.

FIG. 7 is a schematic diagram of a relation of triple judgment conditions for economy adjustment according to some embodiments of the present disclosure. As shown in FIG. 7, a WDM-PON system decides economy adjustment (including activating economy and also including executing a further economy adjustment action) based on triple conditions, which include a first judgment condition, a second judgment condition and a third judgment condition. The first judgment condition is for judgment based on an economy parameter configured on the network manager. The second judgment condition is for judgment based on a service load of each CP. The third judgment condition is for judgment based on an available resource of the entire WDM-PON system, that is, some wavelength resources released after a CP without a service enters a sleep mode.

The economy adjustment is divided into three modes/levels: economy adjustment 1), only adjusting a rate of a CP without adjusting a wavelength; economy adjustment 2), controlling a CP channel to enter a sleep mode, and economy adjustment 3), tuning a channel, i.e. adjusting a wavelength, and selecting, according to power levels of different wavelengths corresponding to various rates, a lowest or lower rate corresponding to a wavelength to which the CP is to be adjusted, and in this case, the rate may be the same as an original rate, and may also be different from the original rate, that is to say, the rate may be adjusted or not adjusted. It should be noted that the above three levels of adjustment depend on the system support, for example, the wavelength routing system cannot use the economy adjustment 3).

The economy mode is configured at the network manager (the economy configuration function at the network manager can be completely integrated in the network management system, or can be operated independently, or can also be placed in the OLT). The economy configuration includes manual economy activation or automatic economy activation, starting and stopping time when the economy mode takes effect, an economy period, a monitoring granularity, etc. If no economy configuration is provided, the network manager may use a default value. The starting and stopping time when the economy mode takes effect refers to starting and stopping time point for the economy status, for example, a relative idle time period of a service is 01:00~ 06:00. The economy period refers to each day, each working day, a holiday, or a self-defined date range. The monitoring granularity refers to a sampling time interval of flow monitoring or prediction. Operations such as speed adjustment and channel closing for a designated CP may also be performed under a manual economy activation mode. The default value is a default economy parameter preset by the network manager, for example, the monitoring or prediction is performed 24 hours per day, and the time granularity is 15 minutes, etc.

In the manual economy activation mode, the PON system forcibly configures the OLT and the ONU with the manually configured parameter through the current economy configuration technical process, for example, a rate and a wavelength may be configured, and in this case, the second judgment condition and the third judgment condition are automatically satisfied. In the manual economy deactivation mode, the PON system configures and restores the original configuration parameter on the OLT and the ONU through this economy configuration technical process.

In the automatic economy activation mode, the network management system automatically judges whether the first judgment condition is satisfied; only after the first judgment condition is satisfied, the PON system judges the second judgment condition for each CP, and determines whether each CP satisfies a speed reduction condition; and when there is a CP needing to be adjusted to a low speed rate in the system, the judgment based on the third judgment condition is performed.

In the third judgment condition:

If the CP sleep condition is satisfied, the current transmission channel is closed and the device operates in the sleep mode (economy adjustment 2).

If the channel switching condition is satisfied, active ONUs are tuned to a new operating wavelength, so as to reduce the total transmission power and avoid the re-registration of the ONUs (economy adjustment 3). In the embodiments of the present disclosure, wavelength tuning is performed for a CP between an OLT and a single ONU, so that the tuning of a single ONU under the OLT is really implemented. When a certain ONU needs to perform wavelength tuning, the ONU may be separately adjusted, instead of all ONUs under the OLT being uniformly adjusted. In this case, after the wavelength tuning, what rate should be used can be further determined, a rate configuration table can be configured, and there are several rates or rate combinations under one wavelength, and which rate should the wavelength be adjusted to in order to achieve a better power saving effect may be determined from the rate configuration table.

If the second judgment condition is satisfied but the third judgment condition is not satisfied, only an economy adjustment of rate reduction (economy adjustment 1) is performed on the current CP. It is recommended to consider whether power saving can be really achieved by the rate adjustment. For example, under the transmission at a rate of 10G and 12.5G between an OLT and an ONU, the optical power levels are substantially the same, and power saving cannot be achieved by the rate adjustment. In this embodiment, it is required to check, per each channel in a current load status, whether an optical power budget level can be decreased by rate reduction, and adjustment is performed only when a power level change can be achieved.

Figure 8:
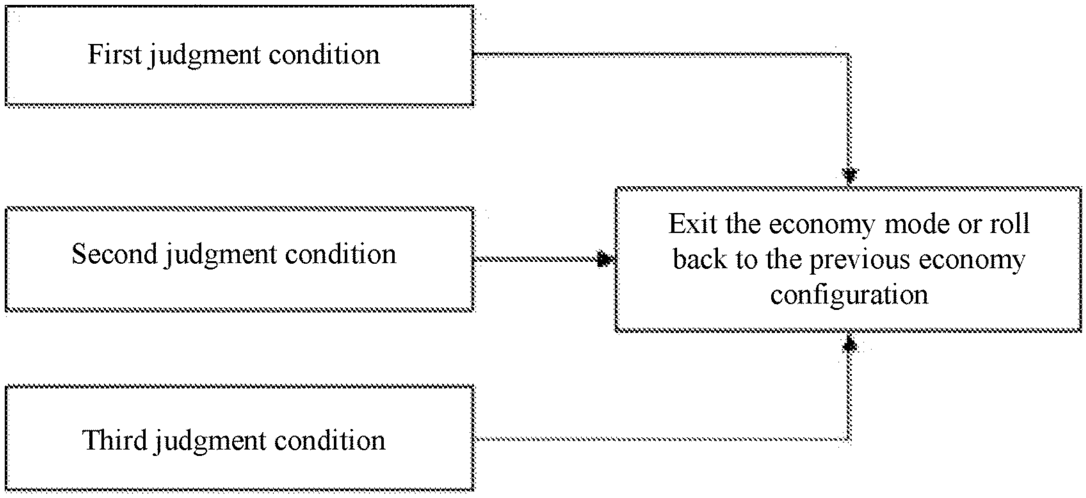
FIG. 8 is a schematic diagram of a relation of triple judgment conditions for economy deactivation or previous economy status maintenance according to some embodiments of the present disclosure.

FIG. 8 is a schematic diagram of a relation of triple judgment conditions for economy deactivation or previous economy status maintenance according to some embodiments of the present disclosure. As shown in FIG. 8, economy deactivation (namely, restoring to an original non-economy status) and previous economy status maintenance (namely, restoring to a previous economy status) may be collectively referred to as restoring an original configuration. The judgment condition for restoring the original configuration is the same as the judgment condition for entering economy adjustment. When any one of the first judgment condition, the second judgment condition and the third judgment condition is not satisfied, the CP which does not satisfy the condition is required to restore the original configuration, i.e., economy deactivation (namely, restoring to the original configuration and operating according to a normal mode) or previous economy status maintenance (namely, restoring to the previous economy status) is performed, and the flow proceeds to the next economy detection and judgment period.

During the process of entering economy adjustment or restoring original configuration, the OLT configures the rate and/or wavelength of the ONU via a certain management control channel, including increasing or reducing the line rate between the OLT and the ONU, opening or closing a sleeping channel between the OLT and the ONU, and tuning the CP between the OLT and the ONU onto another CP, etc. The management control may be implemented by, but is not limited to be implemented by, a PLOAM message, an OAM of the Ethernet, an OMCI defined by G.988, a TR069 protocol, a NETCONF or YANG management model, an SNMP mode, etc. The power saving of the WDM-PON system is realized by newly adding economy message(s) in these management control modes. Taking a PLOAM message as an example, an exemplary definition thereof is shown in Table 1. It should be noted that, in order to avoid a system disorder caused by multiple economy adjustments, configuration data of an original rate and/or an original wavelength should be included in the technical solution, and such data is either carried as the message content or is mapped, or is directly stored through a storage module so as to be subsequently invoked.

TABLE 1

Definitions for the economy PLOAM message

| Word | Name | Meaning |
|---|---|---|
| 1-2 | ONU-ID | ONU identification number |
| 3 | Power_Save_ID | PLOAM message type identification number<br>0xaa: Power_Save_Inquire (instruction message sent by the OLT to the ONU regarding the economy adjustment)<br>0xbb: Power_Save_Response (response message sent by the ONU to the OLT regarding the economy adjustment) |
| 4 | SeqNo | Message sequence number |
| 5 | Economy-mode status | Economy Mode Status:<br>0x01: Economy off<br>0x1a: Economy on<br>Others: Reserved (for subsequent extension) |
| 6 | Current status | Current status:<br>0x00: the OLT sends an ONU economy adjustment (which may be economy activation or further economy adjustment) instruction<br>0x01: the OLT sends an ONU economy deactivation or previous economy status maintenance instruction<br>0x02: the ONU has received the economy adjustment instruction and enters the economy configuration<br>0x03: the ONU has received the ONU economy deactivation or previous economy status maintenance instruction, and enters an economy rollback or non-economy configuration<br>0x04: the OLT waits for ONU clock synchronization<br>0x05: the ONU has completed clock synchronization<br>0x06: ONU clock synchronization failure<br>0x07: economy operating mode<br>0x08: normal operating mode<br>Others: Reserved (for subsequent extension) |
| 7 | Economy rate | Economy rate:<br>0x01: reducing to 1st level rate, 50 Gbps<br>0x02: reducing to 2nd level rate, 25 Gbps<br>0x03: reducing to 3rd level rate, 10 Gbps<br>0x04: reducing to 4th level rate, 1 Gbps<br>. . .<br>0x00: Close Channel Pair and enter a sleep mode<br>Others: Reserved (for subsequent extension) |
| 8-9 | Economy wavelength | Economy wavelength:<br>0x0001: operating wavelength 1<br>0x0002: operating wavelength 2<br>0x0003: operating wavelength 3<br>Etc.<br>0xaaaa: sleep mode dedicated wavelength |
| 10 | Original rate | Original rate:<br>0x01: 50 Gbps<br>0x02: 25 Gbps<br>0x03: 10 Gbps<br>0x04: 1 Gbps<br>Others: Reserved (for subsequent extension) |
| 11-12 | Original wavelength | Original wavelength:<br>0x0001: wavelength 1<br>0x0002: wavelength 2<br>0x0003: wavelength 3<br>etc. |
| 13-40 | Padding | Filled with zeros |
| 41-48 | MIC | Message check bit |

Figure 9:
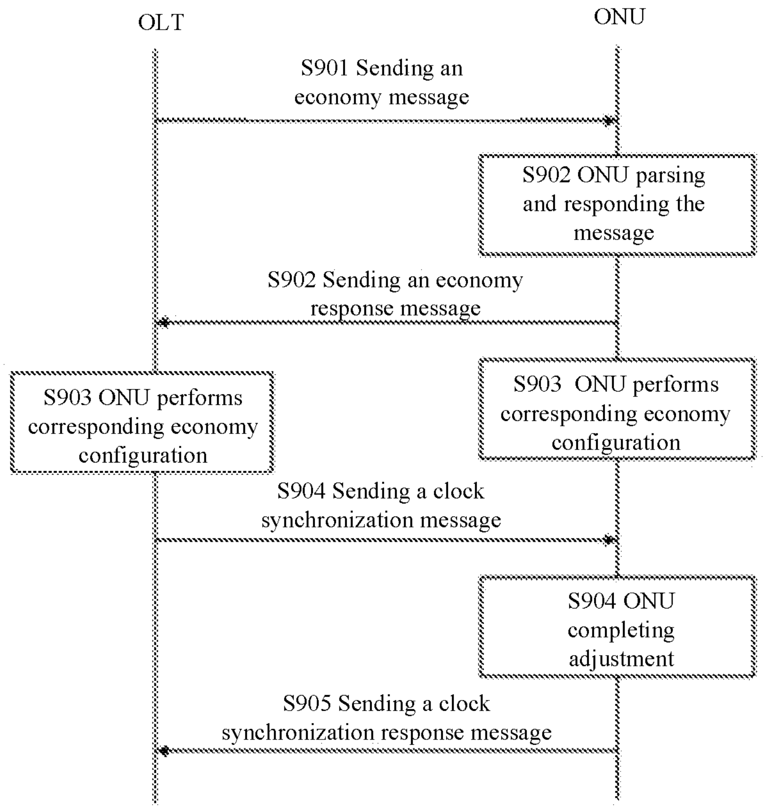
FIG. 9 is a flowchart of a process of operating mode adjustment between an OLT and an ONU according to some embodiments of the present disclosure.

FIG. 9 is a flowchart of a process of operating mode adjustment between an OLT and an ONU according to some embodiments of the present disclosure. As shown in FIG. 9, a message exchange procedure of performing economy configuration between the OLT and the ONU includes the following operations S901 to S905.

In operation S901, when a condition for activating or deactivating an economy mode is satisfied, an OLT sends an economy PLOAM message to an ONU.

In operation S902, the ONU parses the PLOAM message and returns a response message to the PLOAM message.

In operation S903, after receiving the response message, the OLT performs economy configuration at the OLT in response, for example, the OLT adjusts a downstream line rate or closes a current transmission channel and uses a new channel; at the same time, the ONU also needs to perform corresponding economy configuration.

In operation S904, after the OLT completes the economy configuration, the OLT sends a clock synchronization message to the ONU to perform clock synchronization of variable rate, and the ONU receives the clock synchronization message and completes the configuration corresponding to the ONU.

In operation S905, the ONU completes clock synchronization, enters an ONU economy mode and sends a response message to the clock synchronization PLOAM message, and the OLT also enters a corresponding economy operating status after receiving the ONU clock synchronization response message.

Figure 10:
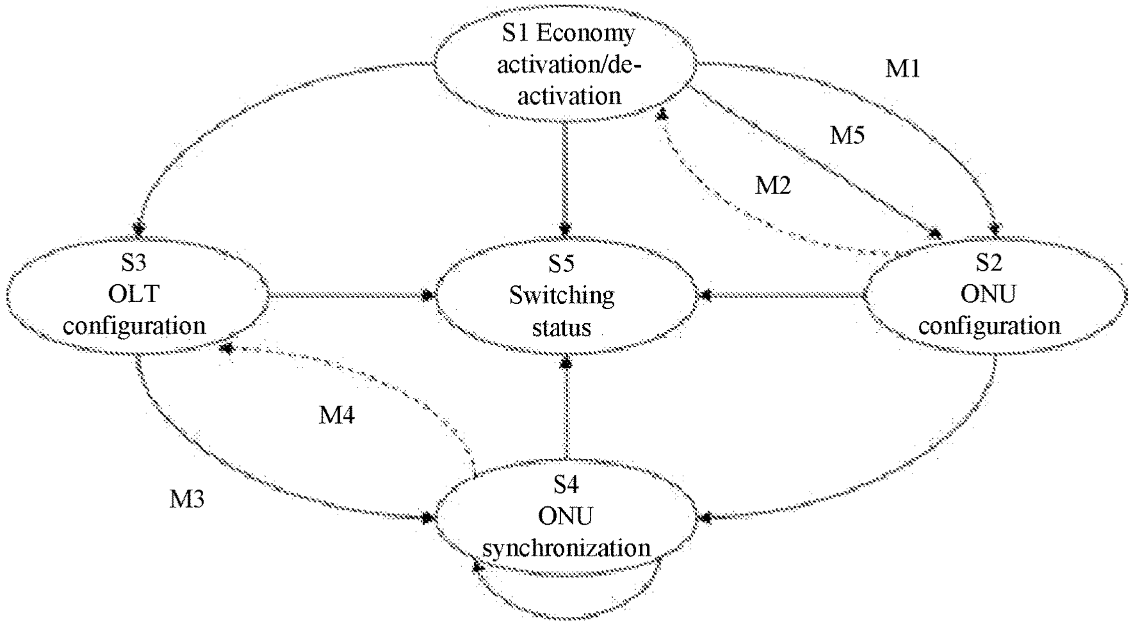
FIG. 10 is a status diagram for operating mode adjustment between an OLT and an ONU according to some embodiments of the present disclosure.

FIG. 10 is a status diagram for operating mode adjustment between an OLT and an ONU according to some embodiments of the present disclosure. As shown in FIG. 10, status transition logic of the OLT and the ONU during the process of economy activation/deactivation is as follows.

S1 is an initial status of economy activation and deactivation, and can represent an initial action of the OLT after an instruction of entering (activating) or exiting (deactivating) an economy mode is received from a network manager.

S2 is a configuration status of the ONU, mainly for adjusting an operating wavelength, rate, and CP of the ONU.

S3 is a configuration status of the corresponding OLT.

S4 is the synchronization status of the ONU, and after the rate or wavelength adjustment is completed, new clock synchronization is maintained with the OLT.

S5 is a switching status, and may be keeping the current operating status unchanged, and may alternatively be entering a new operating status at a new rate, wavelength, and the like.

M1 is an economy PLOAM message sent by an OLT to an ONU, and the ONU enters the S2 status (ONU configuration status) after receiving the message; in this case, the OLT records the message sending time C0, and then waits for a response returned by the ONU, and periodically checks the current time Cx; if the OLT still does not receive an economy response message from the ONU when Cx−C0>dC, the OLT immediately enters the S5 switching status (maintaining a current operating status), and sends an M5 message to the ONU.

M2 is a response of the ONU to the economy message of the OLT; if the OLT receives the economy response message from the ONU when Cx−C0≤dC, then the OLT enters the S3 status from the S1 initial status, and performs the economy configuration (such as rate and wavelength) of the corresponding channel.

M3 is a new clock synchronization message sent by the OLT to the ONU, and is sent to the ONU after the OLT in the S3 status completes configuration; if the ONU receives the synchronization message during the configuration period, the ONU immediately enters the S4 status (ONU synchronization status), and the ONU will continuously receive the synchronization message from the OLT in the S4 status for several synchronization periods, and finally feeds back a synchronization result to the OLT via M3.

M4 is a synchronization result message fed back by the ONU to the OLT; if the ONU completes synchronization within a specified synchronization period, the ONU feeds back a synchronization completion message to the OLT, and enters the S5 switching status (entering a new operating status); if the synchronization is not completed, a synchronization failure message is fed back, and the status is switched to S5 (the current operating status is maintained). After receiving the M4 message, the OLT immediately enters the S5 switching status, and selects to enter a new operating status or maintain a current operating status according to a success or failure result of synchronization.

M5 is a normal operating message sent by the OLT to the ONU; through the message, the OLT notifies the ONU to enter the S5 switching status (keep the current operating status).

Figure 11:
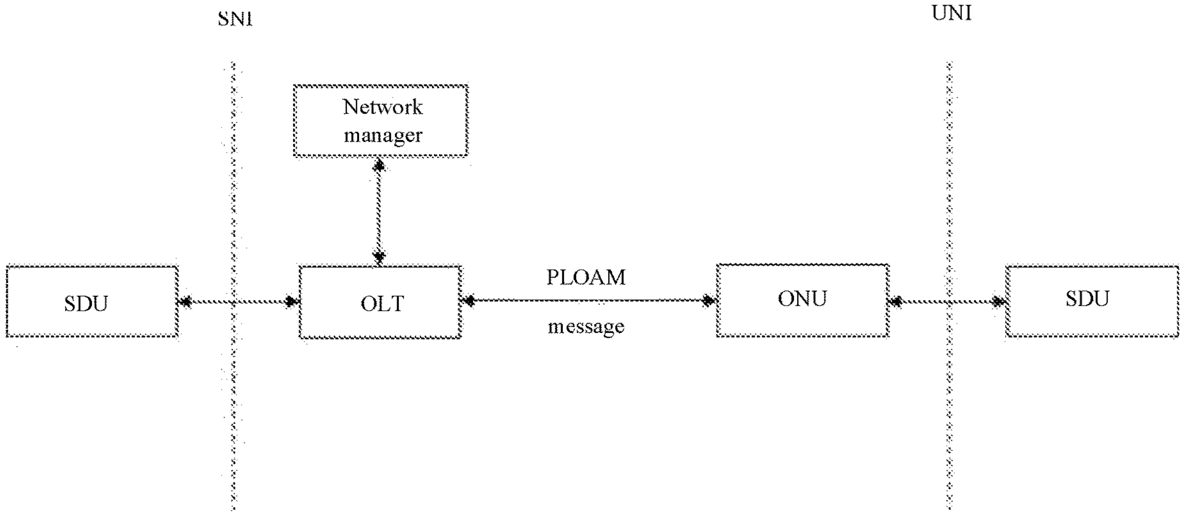
FIG. 11 is a diagram of an economy apparatus for a WDM-PON system according to some embodiments of the present disclosure.
Figure 12:
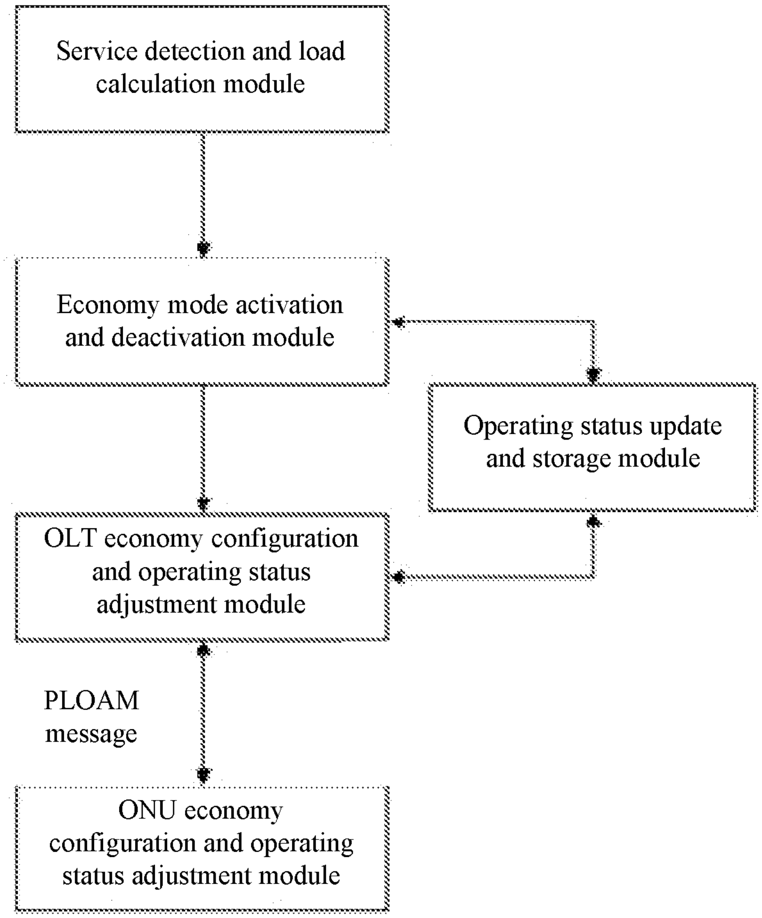
FIG. 12 is a schematic diagram of power saving-related modules of a WDM-PON system according to some embodiments of the present disclosure.

FIG. 11 is a diagram of an economy apparatus for a WDM-PON system according to some embodiments of the present disclosure. As shown in FIG. 11, in addition to the network manager, the OLT and the ONU, a service detection and load calculation module, an economy mode activation and deactivation module, an operating status update and storage module, an OLT economy configuration and operating status adjustment module, and an ONU economy configuration and operating status adjustment module are added in the system. FIG. 12 is a schematic diagram of economy-related modules of a WDM-PON system according to some embodiments of the present disclosure, and shows connection relations of respective modules.

The service detection and load calculation module is responsible for counting upstream and downstream traffic of each OLT-ONU channel under each PON port, and the statistical method is to average the upstream and downstream traffic in a plurality of continuous load detection periods, and use a result thereof in a judgment based on the second judgment condition.

The economy mode activation and deactivation module is adapted to automatically determine the first judgment condition, the second judgment condition, and the third judgment condition. In a manual economy activation mode, when the first judgment condition is satisfied, the second judgment condition and the third judgment condition are automatically satisfied. In the automatic economy activation mode, each condition needs to be judged one by one.

The operating status update and storage module stores the specific contents of the original configuration and the current economy configuration for the OLT and the ONU to quickly perform the economy configuration and the system restoring.

The OLT economy configuration and operating status adjustment module is a logic execution module for the OLT to perform economy and to restore the initial configuration from the economy. The ONU economy configuration and operating status adjustment module is a logic execution module for the ONU to perform economy and to restore the initial configuration from the economy.

The first three modules may be provided on the network manager or on the OLT. The other two modules are located at the OLT and the ONU respectively. In addition, the service detection and load calculation module may alternatively be configured at the DU to update the service load data to the network manager or the OLT through the DU Port.

By means of the economy configuration method and apparatus (system) described in the described embodiments, on the premise of not needing to add a hardware circuit, the economy technical complexity of a WDM-PON system is reduced, the implementation cost of power savings of the system is saved, and a dual guarantee effect of service quality and high-efficiency power savings is achieved. In addition, the problem that an ONU needs to be re-registered in an economy process is overcome, and the application of power savings in a low-delay system is expanded.

The implementation of the technical solution is further described in detail below through exemplary embodiments.

Exemplary Embodiment 1: Power Saving by Reducing Rate of CP

Figure 13:
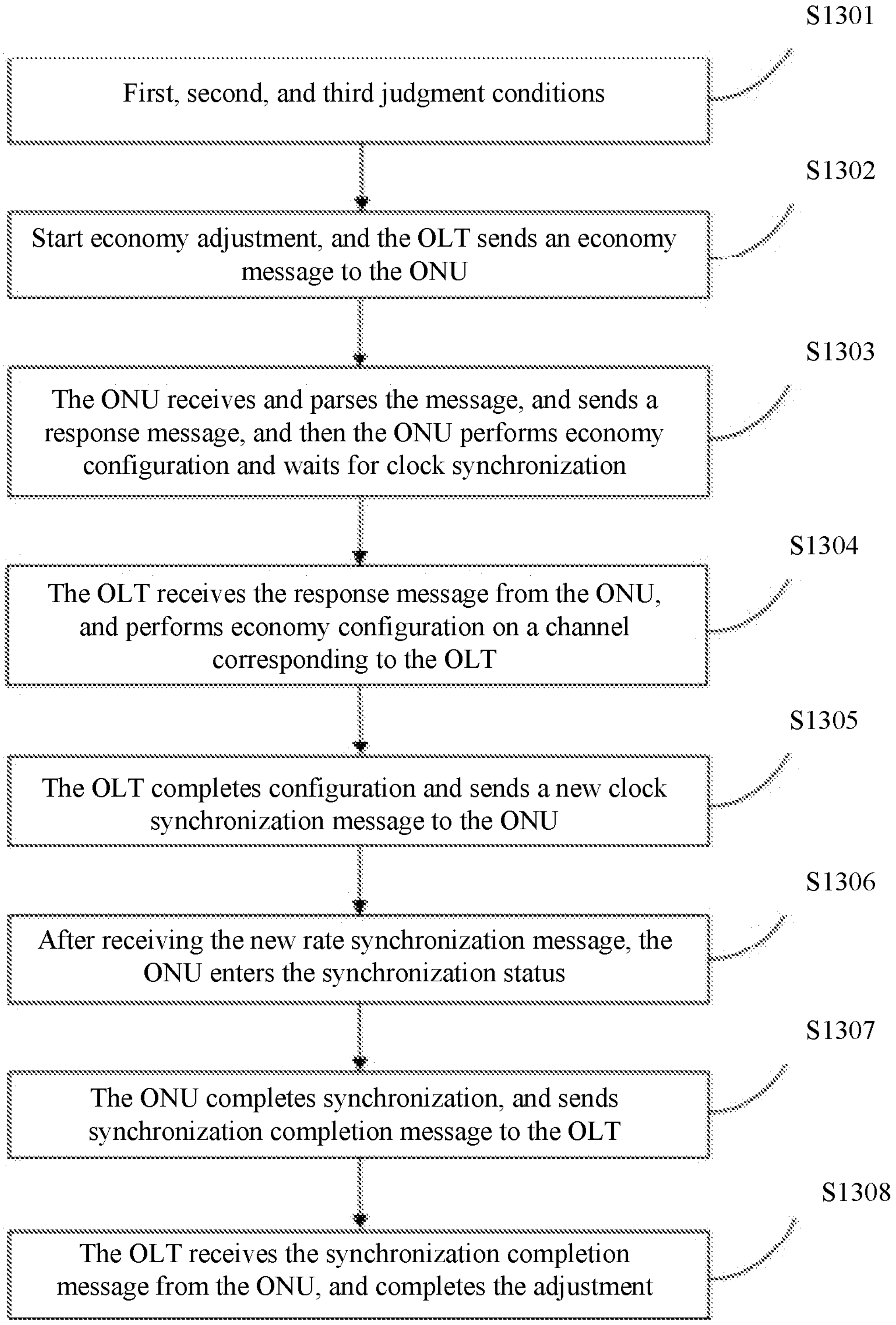
FIG. 13 is a flowchart of economy adjustment achieved by reducing a rate on a Channel Pair (CP) according to Exemplary Embodiment 1 of the present disclosure.

The exemplary embodiment provides an implementation method for achieving power saving by reducing a transmission rate of an OLT-ONU CP (channel pair between the OLT and the ONU). FIG. 13 is a flowchart of economy adjustment achieved by reducing a rate on a Channel Pair (CP) according to Exemplary Embodiment 1 of the present disclosure. As shown in FIG. 13, the economy configuration method includes the following operations S1301 to S1308.

In operation S1301, in the first judgment condition, all the conditions configured by the network manager for entering economy are satisfied, for example, the economy activation period is satisfied, and the number of controllable devices is not zero.

In the second judgment condition, the service load on a single CP satisfies a rate reduction threshold, for example, the service load satisfies max (P1, P2, . . . , PN)<X/R in N continuous economy detection periods, where Pi is the service load measured in the i-th economy detection period, R is the original transmission rate before rate adjustment, and X (X<R) is the lowest-level transmission rate satisfying a current condition and is calculated and obtained by the OLT.

In the third judgment condition, the service load on single CP neither satisfies the channel-closing threshold nor satisfies the channel switching condition. An example of not satisfying the channel-closing condition is that: in N continuous economy detection periods, the total service load is not 0. An example of not satisfying the channel switching condition is that: no wavelength resource with a power level lower than the current power level of the CP is available.

It should be noted that, in this operation, the service load may be counted in a single downstream direction and a single upstream direction, and may also be counted in both upstream and downstream directions, which may be specified by a user at the network manager. The rate reduction and the channel-closing threshold in the second and third judgment conditions are also exemplary, and are not specified in the embodiments of the present disclosure.

In operation S1302, a single-channel rate reduction economy adjustment process is started, and the OLT sends an economy adjustment PLOAM message to the ONU, wherein the value in the economy adjustment PLOAM message is as shown in the following Table 2.

TABLE 2

Value of the economy adjustment PLOAM message

| Word | Name | Value |
|---|---|---|
| 1-2 | ONU-ID | ONU identification number |
| 3 | Message type ID | 0xaa |
| 4 | SeqNo | Current message sequence number |
| 5 | Economy-mode status | 0x1a |
| 6 | Current status | 0x00 |
| 7 | Economy rate | Value corresponding to the rate X |
| 8-9 | Economy wavelength | Value corresponding to the rate X |
| 10 | Original rate | Value corresponding to the rate R |
| 11-12 | Original wavelength | Value corresponding to the rate R |
| 13-40 | Padding | Filled with zeros |
| 41-48 | MIC | Message check bit |

In operation S1303, the ONU receives the economy adjustment PLOAM message sent by the OLT, extracts the message content for parsing, and sends a response message to the OLT according to the upstream bandwidth designated by the OLT, wherein the format of the response message is substantially consistent with the format of the economy adjustment PLOAM message received by the ONU, but the Message type ID is changed to 0×bb, the SeqNo is changed to the current message sequence number, and the Current status is changed to 0×02. After sending the response message, the ONU uses a new transmission rate according to the economy configuration, and waits to receive a clock synchronization signal from the OLT.

In operation S1304, after receiving the response message from the ONU, the OLT immediately performs economy configuration for the CP at the OLT.

In operation S1305, after the OLT completes the configuration, data transmission is performed at the new rate, and clock synchronization information corresponding to the new rate is sent to the ONU. In this case, in the PLOAM message, the Current status value is 0×04.

In operation S1306, the ONU receives the synchronization information and performs synchronization based on the synchronization information. Since the synchronization process is not a mandatory requirement in the ITU-T standard, the technical solution of the exemplary embodiment of the present disclosure does not limit the specific implementation of the synchronization process. The synchronization requirement of the ONU is required to comply with the ITU-T standard.

In operation S1307, after the ONU completes synchronization, the ONU enters an economy operating mode, and sends a synchronization completion response message to the OLT. In this case, the Current status becomes 0×05.

In operation S1308, the OLT receives the synchronization completion response message from the ONU, and completes the economy adjustment. Thereafter, both the OLT and the ONU perform upstream and downstream data transmission at the new rate after economy adjustment. In this case, the Current status in the PLOAM message becomes 0×07.

Exemplary Embodiment 2: Power Saving by Reducing Rate of CP and Switching CP

Figure 14:
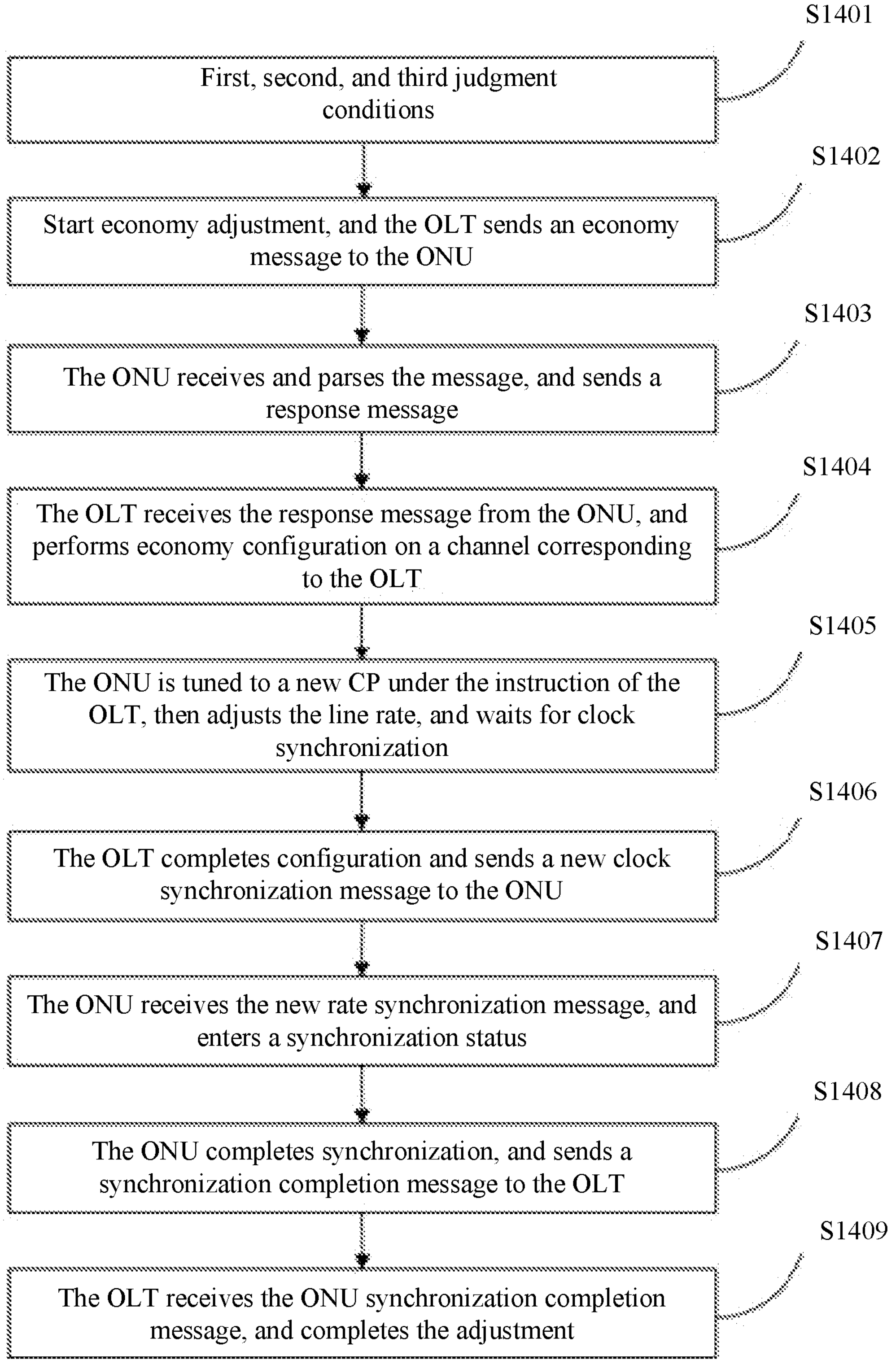
FIG. 14 is a flowchart of economy adjustment achieved by switching a CP and reducing a rate on the CP according to Exemplary Embodiment 2 of the present disclosure.

This exemplary embodiment provides another implementation method for achieving power saving by switching an OLT-ONU Channel Pair and reducing a transmission rate. FIG. 14 is a flowchart of economy adjustment achieved by switching a CP and reducing a rate on the CP according to Exemplary Embodiment 2 of the present disclosure. As shown in FIG. 14, the economy configuration method includes the following operations S1401 to S1409.

In operation S1401, both the first judgment condition and the second judgment condition are satisfied; and in the third judgment condition, a single CP satisfies the channel switching condition. For example, in N continuous economy detection periods, the total service load is not 0, but there is an available wavelength resource with a power level lower than that of the current CP.

In operation S1402, a single-channel rate reduction economy adjustment process starts to be executed. The OLT sends an economy adjustment PLOAM message to the ONU, wherein the value of the economy adjustment PLOAM message is as shown in Table 3.

TABLE 3

Value of the economy PLOAM message

| Word | Name | Value |
|---|---|---|
| 1-2 | ONU-ID | ONU identification number |
| 3 | Message type ID | 0xaa |
| 4 | SeqNo | Current message sequence number |
| 5 | Economy-mode status | 0x1a |
| 6 | Current status | 0x00 |
| 7 | Economy rate | Taking the value corresponding to the new CP rate |
| 8-9 | Economy wavelength | Taking the value corresponding to the new CP wavelength |
| 10 | Original rate | Taking the value corresponding to the rate R |
| 11-12 | Original wavelength | Taking the value corresponding to the rate R |
| 13-40 | Padding | Filled with zeros |
| 41-48 | MIC | Message check bit |

In operation S1403, the ONU receives the economy adjustment PLOAM message sent by the OLT, extracts and parses the message content, and sends a response message to the OLT according to an upstream bandwidth designated by the OLT, wherein the format of the response message is substantially the same as the format of the economy adjustment PLOAM message received by the ONU, the Message type ID in the response message is changed to 0×bb, the SeqNo in the response message is changed to a current message sequence number, and the Current status in the response message is changed to 0×02.

In operation S1404, after receiving the response message from the ONU, the OLT performs an economy configuration on a corresponding CP at the OLT. In the configuration process, the OLT performs a wavelength tuning operation on the ONU according to different values of the Economy wavelength and the Original wavelength. A specific tuning process is not limited in the embodiments of the present disclosure. During the tuning process, an OLT calculates an equivalent ranging result at the new wavelength by using an existing ranging result and an EqD. The distances between the ONU and different OLTs are different, and therefore the distance EQD between the ONU and the OLT needs to be considered when establishing a connection relationship between the ONU and the OLT. The EQD may vary at different rates and different wavelengths. The adjustment of the wavelength and the rate may cause the EQD to change, and the original EQD cannot be used for registration and communication. In the embodiments of the present disclosure, during adjustment, the EQD may be calculated based on a new wavelength and rate carried in the management control message (for example, the described economy adjustment PLOAM message) by means of a formula or an equivalent relationship. In this way, during adjustment, registration of the ONU to the OLT by means of executing activation and online processes is no longer needed, and the ONU only needs to notify a previous wavelength rate and a new wavelength rate through the economy adjustment PLOAM message in a switching process, so that the EQD can be calculated without a registration process, thereby avoiding the problem that the ONU needs to re-register when operating on a new wavelength.

In operation S1405, after sending the response message, the ONU switches (tunes) to the new operating wavelength and the new transmission rate under the direction of the OLT according to the economy configuration, and then waits to receive a clock synchronization signal from the OLT.

In operation S1406, after the OLT completes the configuration, the OLT performs data transmission at the new rate, and sends the clock synchronization information corresponding to the new rate to the ONU. In this case, the Current status value in the PLOAM message is 0×04.

In operation S1407, the ONU receives the synchronization information and performs synchronization based on the synchronization information. Since the synchronization process is not a mandatory requirement in the ITU-T standard, the technical solution of the exemplary embodiment of the present disclosure does not limit the specific implementation of the synchronization process. The synchronization requirement of the ONU is required to comply with the ITU-T standard.

In operation S1408, after the synchronization is completed, the ONU enters the economy operating mode, and sends a synchronization completion response message to the OLT. In this case, the Current status becomes 0×05.

In operation S1409, the OLT receives the synchronization completion response message from the ONU and completes the economy adjustment. Thereafter, both the OLT and the ONU perform upstream and downstream data transmission at the new rate after economy adjustment, and the Current status in the PLOAM message becomes 0×07.

Exemplary Embodiment 3: Power Saving by Entering Sleep Mode

Figure 15:
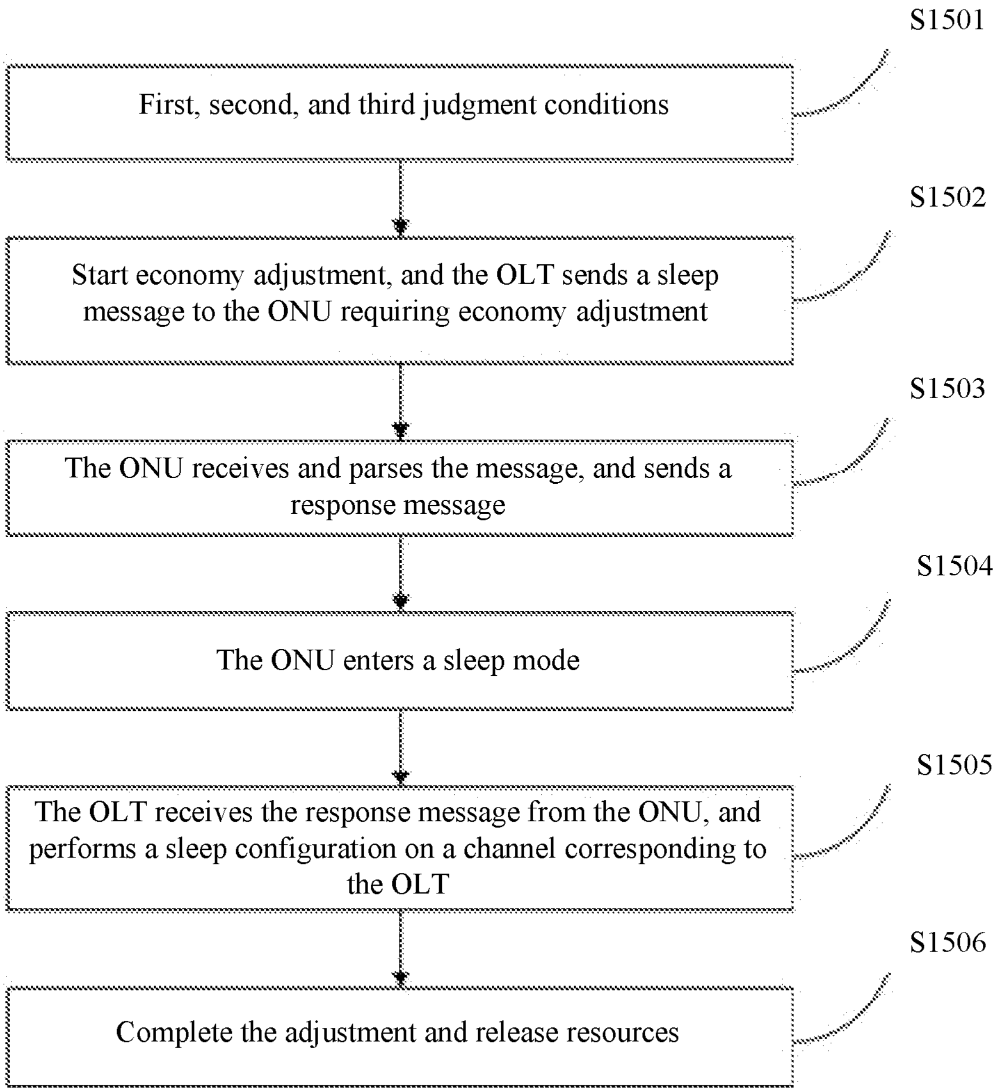
FIG. 15 is a flowchart of economy adjustment achieved by controlling a channel to enter a sleep mode according to Exemplary Embodiment 3 of the present disclosure.

The exemplary embodiment provides a process for achieving deep-level power saving by controlling an OLT-ONU channel pair to enter a sleep mode. FIG. 15 is a flowchart of economy adjustment achieved by controlling a channel to enter a sleep mode according to Exemplary Embodiment 3 of the present disclosure. As shown in FIG. 15, the economy configuration method includes the following operations S1501 to S1506.

In operation S1501, the first and second judgment conditions are the same as those in Exemplary Embodiment 1; in the third judgment condition, the service load of a single CP satisfies a channel closing threshold, for example, in N continuous economy detection periods, the total service load is 0.

In operation S1502, a channel sleep economy adjustment process is started, and the OLT sends an economy adjustment PLOAM message to the ONU satisfying the sleep condition, wherein the value in the economy adjustment PLOAM message is shown in Table 4.

TABLE 4

Value of the economy adjustment PLOAM message

| Word | Name | Value |
|---|---|---|
| 1-2 | ONU-ID | ONU identification number |
| 3 | Message type ID | 0xaa |
| 4 | SeqNo | Current message sequence number |
| 5 | Economy-mode status | 0x1a |
| 6 | Current status | 0x00 |
| 7 | Economy rate | 0x00 |
| 8-9 | Economy wavelength | 0xaaaa |
| 10 | Original rate | Value corresponding to an original rate R |
| 11-12 | Original wavelength | Value corresponding to an original rate R |
| 13-40 | Padding | Filled with zeros |
| 41-48 | MIC | Message check bit |

In operation S1503, the ONU receives the economy adjustment PLOAM message sent by the OLT, extracts and parses the message content, and sends a response message to the OLT according to the upstream bandwidth designated by the OLT, wherein the format of the response message is substantially the same as the format of the economy adjustment PLOAM message received by the ONU, the Message type ID in the response message is changed to 0×bb, the SeqNo in the response message is changed to the current message sequence number, and the Current status in the response message is changed to 0×02.

In operation S1504, after sending the response message, the ONU enters the sleep mode according to the economy configuration.

In operation S1505, after receiving the response message from the ONU, the OLT configures the sleep mode for the corresponding CP on the OLT.

In operation S1506, after the corresponding CP between the OLT and the ONU enters the sleep mode, the original wavelength resource of the CP is released, so that other required ONUs can use the original wavelength resource. Thereafter, the Current status in the PLOAM message becomes 0×07. After the sleep adjustment is completed, the CP corresponding to the OLT and the ONU sends or receives a restoring instruction from the user or OLT during the sleep period by using the sleep dedicated wavelength and the dedicated rate.

Exemplary Embodiment 4: Economy Adjustment Failure-Restore Original Operating Status The exemplary embodiment provides a flow of restoring an original configuration and normally operating after economy adjustment fails, and this flow is described below with reference to FIG. 10.

After the PON system enters the S1 economy activation/deactivation status, if the adjustment is activated, the OLT sends an M1 economy adjustment message to the ONU. In this case, the OLT judges the status of the ONU according to whether the OLT receives the economy response message of the ONU within a specified time dC.

If the OLT fails to receive the message M2 within the specified time dC, it is determined that the adjustment fails. The OLT sends an M5 economy deactivation message (the value of the Economy-mode status in the M5 message is 0×01) to the ONU, and the ONU needs to restore the original configuration and enters the S5 switching status (in this case, the switching status remains unchanged, that is, the switching status is the original operating status), and waits for the arrival of the next economy adjustment period.

If the OLT receives the M2 message within the specified time dC, the ONU enters the S2 status, and the OLT enters the S3 status. Thereafter, the OLT sends an M3 synchronization clock message to the ONU, and the ONU enters the S4 synchronization status. If the OLT does not receive the M4 message sent by the ONU in the specified synchronization window, the OLT determines that the synchronization of the ONU fails, and needs to quit the economy adjustment process. In this case, the CP corresponding to the ONU and the OLT both need to restore the original configuration, enter the S5 switching status (in this case, the switching status remains unchanged, that is, the switching status is the original operating status), and wait for the arrival of the next economy adjustment period.

Exemplary Embodiment 5: Restoring to Original Operating Status from Economy Status In the present exemplary embodiment, a procedure for restoration from the economy operating mode to the original operating mode is provided. When any one of the triple judgment conditions is not satisfied, the economy operating mode needs to be restored to the normal operating mode.

When the restoration process happens in the S1 economy activation/deactivation status, the OLT sends an M5 economy deactivation message (the value of Economy-mode status in the M5 message is 0×01) to the ONU. There may be two cases of whether to perform the CP switching restoration, depending on whether the value of the Economy wavelength in the message M5 is the same as that of the original wavelength.

If the Economy wavelength is the same as the Original wavelength, the CP does not need to be switched. The process of restoring from the economy status to the normal operating status is substantially the same as that in Exemplary Embodiment 1, and will not be repeated here. However, it should be noted that both the CP corresponding to the ONU and the CP corresponding to the OLT take values of the Original rate and the Original wavelength in the PLOAM message.

If the Economy wavelength is different from the Original wavelength, the CP needs to be switched. The process of restoring from the economy status to the normal operating status is substantially the same as that in Exemplary Embodiment 2, and is not further described.

It should be noted that Exemplary Embodiments 4 and 5 are applicable to a case that an original status needs to be restored after economy adjustment is performed according to an economy adjustment manner in Exemplary Embodiments 1 to 3, and may be combined with Exemplary Embodiments 1 to 3 arbitrarily.

In conclusion, the embodiments of the present disclosure provide an economy configuration method and apparatus for a passive optical network, and a storage medium. In the economy configuration method, in combination with the combined judgment conditions constructed by the network management system, the economy activation and economy deactivation of a PON system are controlled. In the economy control message, a wavelength, a data transmission rate and an economy adjustment status flag of an ONU operating in an economy mode can be explicitly carried or can be parsed out, and the wavelength and the rate of an OLT and an ONU may be simultaneously adjusted by using a management control channel of the passive optical network system. Each wavelength and the rate(s) that can be supported by the wavelength may be stored in a table, and the wavelength and the rate to be adjusted may be found by looking up the table. The combined judgment conditions are based on the load of each CP detected by the network management system and/or external DU, the economy control parameter at the network manager, and the overall load condition of the whole OLT. The economy management control may be implemented, but is not limited to be implemented, by a PLOAM message, an OAM of the Ethernet, an OMCI defined in G.988, a TR069 protocol, a NETCONF or YANG management model, an SNMP mode, etc., and the PLOAM message is taken as an example for illustrating the content of the economy adjustment PLOAM message in the economy adjustment process. In addition, a comprehensive economy adjustment process, that has the ability to adjust the rate, switch wavelength channels, and put channels to sleep, as well as a message sending and responding flow under adjustment success or adjustment failure are designed, so that the ONU will not quit and then re-register in the entire process. This economy configuration in the passive optical network achieves flexible operating parameter configuration and adjustment, reducing the complexity of energy saving optimization in the passive optical network.

Obviously, those having ordinary skill in the art should understand that each module or each operation of the present disclosure may be implemented by a universal computing apparatus, and the modules or operations may be concentrated on a single computing apparatus or distributed on a network formed by a plurality of computing apparatuses, and may be implemented by program codes executable for the computing apparatuses, so that the modules or operations may be stored in a storage apparatus for execution with the computing apparatuses. The shown or described operations may be executed in sequences different from those described here in some cases, or may form each integrated circuit module respectively, or multiple modules or operations therein may form a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. An economy configuration method for a passive optical network, the economy configuration method comprising:

sending, by an Optical Line Terminal (OLT), an economy control message to an Optical Network Unit (ONU), wherein the economy control message comprises both a first operating parameter and a second operating parameter of a Channel Pair (CP) between the OLT and the ONU, wherein the first operating parameter is an operating parameter of the CP in a target economy status; and the second operating parameter is an operating parameter of the CP in an original status or a previous economy status; and configuring, by the OLT, the OLT according to the first operating parameter or the second operating parameter.

2. The economy configuration method according to claim 1, wherein the configuring, by the OLT, the OLT according to the first operating parameter or the second operating parameter comprises:

in a case where the economy control message is used for economy adjustment, configuring, by the OLT, the OLT according to the first operating parameter; or, in a case where the economy control message is used for economy deactivation or previous economy status maintenance, configuring, by the OLT, the OLT according to the second operating parameter.

3. The economy configuration method according to claim 2, wherein in a case where the economy control message is used for economy adjustment, the economy configuration method further comprises in a case where an economy adjustment response message returned by the ONU is received within a first preset duration after the economy control message used for economy adjustment is sent, configuring, by the OLT, the OLT according to the first operating parameter;

or, in a case where an-the economy adjustment response message returned by the ONU is not received within a the first preset duration after the economy control message used for economy adjustment is sent, sending, by the OLT, the economy control message used for economy deactivation or previous economy status maintenance to the ONU.

4. The economy configuration method according to claim 2, wherein after the configuring, by the OLT, the OLT according to the first operating parameter, the economy configuration method further comprises: sending, by the OLT, a clock synchronization message to the ONU, and receiving, by the OLT, a synchronization response message returned by the ONU; in a case where the synchronization response message indicates synchronization success, performing, by the OLT, data transmission with the ONU through the CP according to the first operating parameter; and in a case where the synchronization response message indicates synchronization failure, sending, by the OLT, the economy control message used for economy deactivation or previous economy status maintenance to the ONU;

or, after the configuring, by the OLT, the OLT according to the second operating parameter, the economy configuration method further comprises: sending, by the OLT, a clock synchronization message to the ONU, and receiving, by the OLT, a synchronization response message returned by the ONU; in a case where the synchronization response message indicates synchronization success, performing, by the OLT, data transmission with the ONU through the CP according to the second operating parameter; and in a case where the synchronization response message indicates synchronization failure, sending, by the OLT, the economy control message used for economy deactivation or previous economy status maintenance to the ONU again.

5. The economy configuration method according to claim 1, wherein the economy control message further comprises at least one of:

an economy mode status, wherein the economy mode status is used for indicating whether the economy control message is used for economy adjustment, or is used for economy deactivation or previous economy status maintenance; and a status flag, wherein the status flag is used for indicating a current phase to which the economy control message belongs in an economy adjustment procedure or in an economy deactivation or previous economy status maintenance procedure.

6. The economy configuration method according to claim 1, further comprising one of:

receiving, by the OLT, an adjustment policy used for performing economy adjustment for the CP and designated in a manual manner, and generating, by the OLT based on the adjustment policy, the economy control message used for economy adjustment;

determining, by the OLT according to a load of the CP, to perform economy adjustment for the CP, selecting, by the OLT, an adjustment policy used for performing economy adjustment, and generating, by the OLT based on the adjustment policy, the economy control message used for economy adjustment;

receiving, by the OLT, an adjustment policy used for economy adjustment for the CP and sent by a network manager after the network manager determines, according to a load of the CP, to perform economy adjustment for the CP and selects an adjustment policy used for performing economy adjustment, and generating, by the OLT based on the adjustment policy, the economy control message used for economy adjustment.

7. The economy configuration method according to claim 6, wherein before the adjustment policy used for performing economy adjustment for the CP is designated in the manual manner, or before it is determined, according to the load of the CP, to perform economy adjustment for the CP, the economy configuration method further comprises:

determining that a first condition is satisfied, wherein the first condition comprises at least one of the following sub-conditions:

a current time satisfies an economy time parameter configured by the network manager;

the OLT and/or the ONU are located in an area range defined by a device area parameter configured by a network device;

the OLT and/or the ONU belong to a type range defined by a device type parameter configured by the network device; and the OLT and/or the ONU support economy adjustment.

8. The economy configuration method according to claim 6, wherein the determining, according to a load of the CP, to perform economy adjustment for the CP comprises:

in a case where it is determined that a second condition is satisfied according to the load of the CP, determining to perform economy adjustment for the CP, wherein the second condition comprises that the load of the CP is lower than a load threshold.

9. The economy configuration method according to claim 6, wherein the adjustment policy comprises one of:

adjusting a line rate of the CP;

adjusting the CP to enter a sleep mode; or adjusting a line rate and an operating wavelength of the CP.

10. The economy configuration method according to claim 9, wherein the selecting an adjustment policy used for performing economy adjustment comprises:

selecting, based on a third condition, the adjustment policy used for economy adjustment, wherein the third condition comprises at least one of the following sub-conditions:

in a case where the load of the CP satisfies a CP sleep condition, selecting the adjustment policy of adjusting the CP to enter the sleep mode;

in a case where there are other wavelength channels having an optical link power level lower than a current optical link power level of the CP, selecting the adjustment policy of adjusting the operating wavelength of the CP, wherein after the operating wavelength of the CP is adjusted, the line rate of the CP is determined based on the other wavelength channels;

in a case where there are no other wavelength channels having an optical link power level lower than the current optical link power level of the CP, and there is another line rate that is lower than a current line rate and is able to fulfill transmission of the current load of the CP, selecting the adjustment policy of adjusting the line rate of the CP, wherein the line rate after the adjustment is said another line rate.

11. The economy configuration method of claim 1, further comprising one of:

receiving, by the OLT, an instruction used for performing economy deactivation or previous economy status maintenance for the CP and designated in a manual manner, and generating, by the OLT based on the instruction, the economy control message used for economy deactivation or previous economy status maintenance;

determining, by the OLT, that an economy condition is not satisfied currently, and generating, by the OLT, the economy control message used for economy deactivation;

receiving, by the OLT, an instruction used for performing economy deactivation for the CP and sent by a network manager after the network manager determines that an economy condition is not satisfied currently, and generating, by the OLT based on the instruction, the economy control message or message group used for economy deactivation.

12. The economy configuration method of claim 11, wherein the economy condition comprises a first condition, a second condition, and a third condition, wherein the first condition comprises at least one of the following sub-conditions: a current time satisfies an economy time parameter configured by the network manager; the OLT and/or the ONU are located in an area range defined by a device area parameter configured by a network device; the OLT and/or the ONU belong to a type range defined by a device type parameter configured by the network device; and the OLT and/or the ONU support economy adjustment;

the second condition comprises that a load of the CP is lower than a load threshold;

the third condition comprises at least one of the following sub-conditions: in a case where the load of the CP satisfies a CP sleep condition, selecting an adjustment policy of adjusting the CP to enter a sleep mode; in a case where there are other wavelength channels having an optical link power level lower than a current optical link power level of the CP, selecting the adjustment policy of adjusting an operating wavelength of the CP, wherein after the operating wavelength of the CP is adjusted, a line rate of the CP is determined based on the other wavelength channels; in a case where there are no other wavelength channels having an optical link power level lower than the current optical link power level of the CP, and there is another line rate that is lower than a current line rate and is able to fulfill transmission of the current load of the CP, selecting the adjustment policy of adjusting the line rate of the CP, wherein the line rate after the adjustment is said another line rate.

13. An economy configuration method for a passive optical network, the economy configuration method comprising:

receiving, by an Optical Network Unit (ONU), an economy control message sent by an Optical Line Terminal (OLT), wherein the economy control message comprises both a first operating parameter and a second operating parameter of a Channel Pair (CP) between the OLT and the ONU, wherein the first operating parameter is an operating parameter of the CP in a target economy status; and the second operating parameter is an operating parameter of the CP in an original status or a previous economy status; and configuring, by the ONU, the ONU according to the first operating parameter or the second operating parameter.

14. The economy configuration method according to claim 13, wherein the configuring, by the ONU, the ONU according to the first operating parameter or the second operating parameter comprises:

in a case where the economy control message is used for economy adjustment, configuring, by the ONU, the ONU according to the first operating parameter; or, in a case where the economy control message is used for economy deactivation or previous economy status maintenance, configuring, by the ONU, the ONU according to the second operating parameter.

15. The economy configuration method according to claim 14, wherein the configuring, by the ONU, the ONU according to the first operating parameter comprises: parsing, by the ONU, the economy control message used for economy adjustment, returning, by the ONU, an economy adjustment response message to the OLT, and then configuring, by the ONU, the ONU according to the first operating parameter;

or, the configuring, by the ONU, the ONU according to the second operating parameter comprises: parsing, by the ONU, the economy control message used for economy deactivation or previous economy status maintenance, returning, by the ONU, an economy deactivation or previous economy status maintenance response message to the OLT, and then configuring, by the ONU, the ONU according to the second operating parameter.

16. The economy configuration method according to claim 13, further comprising:

receiving, by the ONU, a clock synchronization message sent by the OLT; and performing, by the ONU, clock synchronization based on the clock synchronization message, and returning, by the ONU, a synchronization response message to the OLT, wherein the synchronization response message indicates synchronization success or synchronization failure.

17. An electronic device, comprising a memory, a processor, and a computer program stored on the memory and capable of running on the processor, wherein the processor, when executing the computer program, implements operations of the economy configuration method according to claim 1.

18. An electronic device, comprising a memory, a processor, and a computer program stored on the memory and capable of running on the processor, wherein the processor, when executing the computer program, implements operations of the economy configuration method according to claim 4.

19. The economy configuration method according to claim 2, wherein in a case where the economy control message is used for economy deactivation or previous economy status maintenance, the economy configuration method further comprises:

in a case where an economy deactivation or previous economy status maintenance response message returned by the ONU is received within a second preset duration after the economy control message used for economy deactivation or previous economy status maintenance is sent, configuring, by the OLT, the OLT according to the second operating parameter; or, in a case where the economy deactivation or previous economy status maintenance response message returned by the ONU is not received within the second preset duration after the economy control message used for economy deactivation or previous economy status maintenance is sent, sending, by the OLT, the economy control message used for economy deactivation or previous economy status maintenance to the ONU again.

20. The economy configuration method according to claim 13, wherein the economy control message further comprises at least one of:

an economy mode status, wherein the economy mode status is used for indicating whether the economy control message is used for economy adjustment, or is used for economy deactivation or previous economy status maintenance; and a status flag, wherein the status flag is used for indicating a current phase to which the economy control message belongs in an economy adjustment procedure or in an economy deactivation or previous economy status maintenance procedure.

* * * * *